United States Patent
Cline et al.

[11] Patent Number: 5,857,589
[45] Date of Patent: Jan. 12, 1999

[54] METHOD AND APPARATUS FOR ACCURATELY DISPENSING LIQUIDS AND SOLIDS

[75] Inventors: David J. Cline, Long Beach; Steven Smith, Tustin; Timothy S. Clark, San Francisco, all of Calif.

[73] Assignee: Fluid Research Corporation, Costa Mesa, Calif.

[21] Appl. No.: 752,768

[22] Filed: Nov. 20, 1996

[51] Int. Cl.⁶ .................................................. B67B 7/00
[52] U.S. Cl. ............................ 222/1; 222/55; 222/63; 222/135; 222/410
[58] Field of Search ............................. 222/63, 55, 639, 222/410, 135, 1

[56] References Cited

U.S. PATENT DOCUMENTS

| | | | |
|---|---|---|---|
| 4,170,319 | 10/1979 | Suh et al. ................................. | 222/134 |
| 4,311,586 | 1/1982 | Baldwin et al. ......................... | 210/101 |
| 4,341,327 | 7/1982 | Zeitz ........................................ | 222/63 |
| 4,407,431 | 10/1983 | Hutter, III ................................ | 221/1 |
| 4,487,333 | 12/1984 | Pounder et al. .......................... | 222/54 |
| 4,493,286 | 1/1985 | Carson .................................... | 118/677 |
| 4,538,221 | 8/1985 | Crain et al. .............................. | 364/172 |
| 4,547,128 | 10/1985 | Hayes ....................................... | 417/2 |
| 4,635,825 | 1/1987 | Tulasne ................................. | 222/129.1 |
| 4,719,574 | 1/1988 | Duback et al. .......................... | 364/468 |
| 4,789,100 | 12/1988 | Senf ......................................... | 239/61 |
| 4,830,218 | 5/1989 | Shirkhan ................................. | 222/52 |
| 4,854,482 | 8/1989 | Bergner ................................... | 222/94 |
| 4,871,262 | 10/1989 | Krauss et al. ........................... | 366/160 |
| 4,892,410 | 1/1990 | Snow et al. ............................. | 366/2 |
| 5,018,645 | 5/1991 | Zinsmeyer ............................... | 222/14 |
| 5,033,644 | 7/1991 | Tentler .................................... | 222/57 |
| 5,139,045 | 8/1992 | Ensign .................................... | 137/144 |
| 5,163,010 | 11/1992 | Klein et al. ............................. | 364/479 |
| 5,192,000 | 3/1993 | Wandrick et al. ....................... | 222/59 |
| 5,228,594 | 7/1993 | Aslin ....................................... | 222/63 |
| 5,257,720 | 11/1993 | Wule et al. .............................. | 222/20 |
| 5,271,521 | 12/1993 | Noss et al. ............................... | 222/1 |
| 5,291,951 | 3/1994 | Morand .................................... | 169/14 |
| 5,330,072 | 7/1994 | Ferri, Jr. et al. ........................ | 222/1 |
| 5,332,125 | 7/1994 | Schmitkons et al. .................... | 222/1 |
| 5,340,210 | 8/1994 | Patel et al. .............................. | 366/132 |
| 5,344,044 | 9/1994 | Hayden et al. .......................... | 222/1 |
| 5,383,581 | 1/1995 | Le Marbe et al. ....................... | 222/459 |
| 5,388,761 | 2/1995 | Langeman .............................. | 239/1 |
| 5,407,267 | 4/1995 | Davis et al. ............................. | 366/152 |
| 5,409,310 | 4/1995 | Owczarz ................................ | 366/136 |
| 5,417,346 | 5/1995 | Ferri, Jr. et al. ........................ | 222/61 |

*Primary Examiner*—Gregory L. Huson
*Attorney, Agent, or Firm*—Lyon & Lyon LLP

[57] ABSTRACT

A system for metering and dispensing single and plural component liquids and solids as described herein. The dispensing system has a microprocessor-based control system and volumetrically efficient non-reciprocating pumps which provide a very accurate control of component ratios, shot sizes, flow rates and dispense durations. The dispensing system maintains constant pressure between the output of the pump and the dispense head. The progressive cavity pump is formed from individual, interlocking pressure sections, each of which has a double helix bore. A rotor is inserted into the double helix bore with an interference fit. The dispense head has no dynamic fluid sealing surfaces and instead uses bellows as a sealing mechanism. The dispensing system includes a simple, easy to use calibration procedure and a weight scale. The system also has numerous feedback components for accurately controlling the pressure, flow rates, fluid levels and amounts of fluids dispensed.

74 Claims, 18 Drawing Sheets

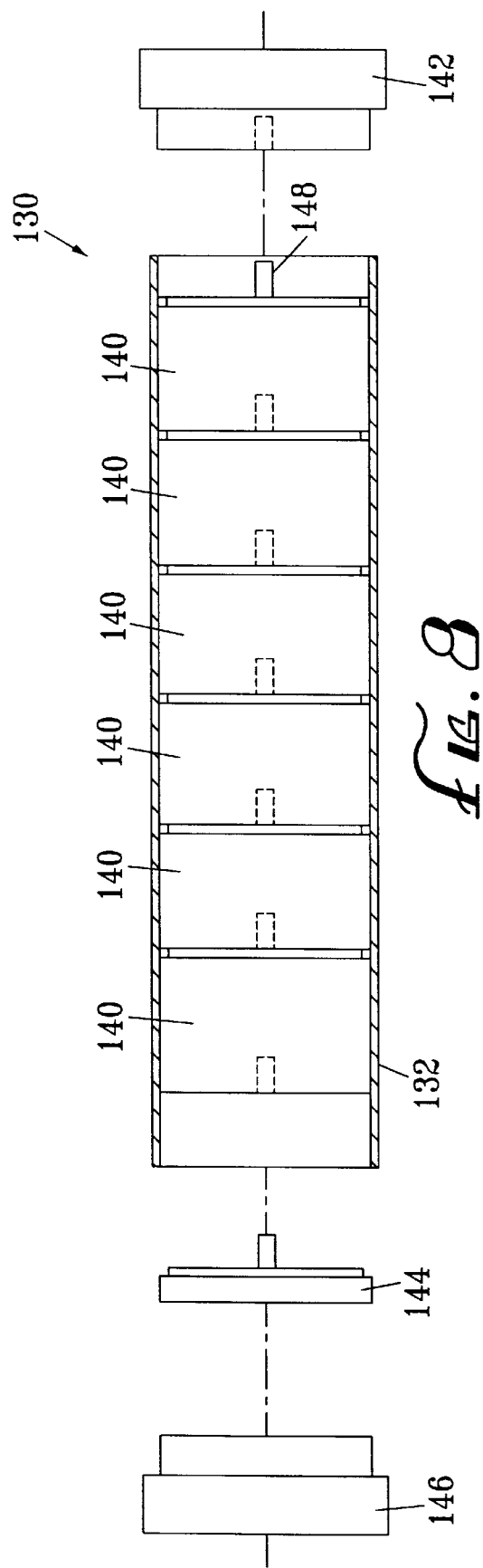
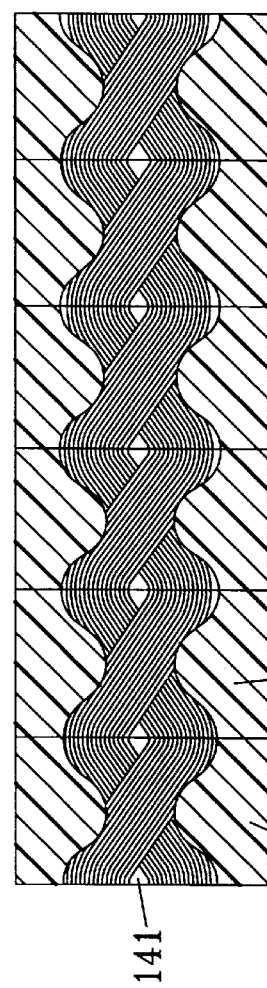
Fig. 8
Fig. 13

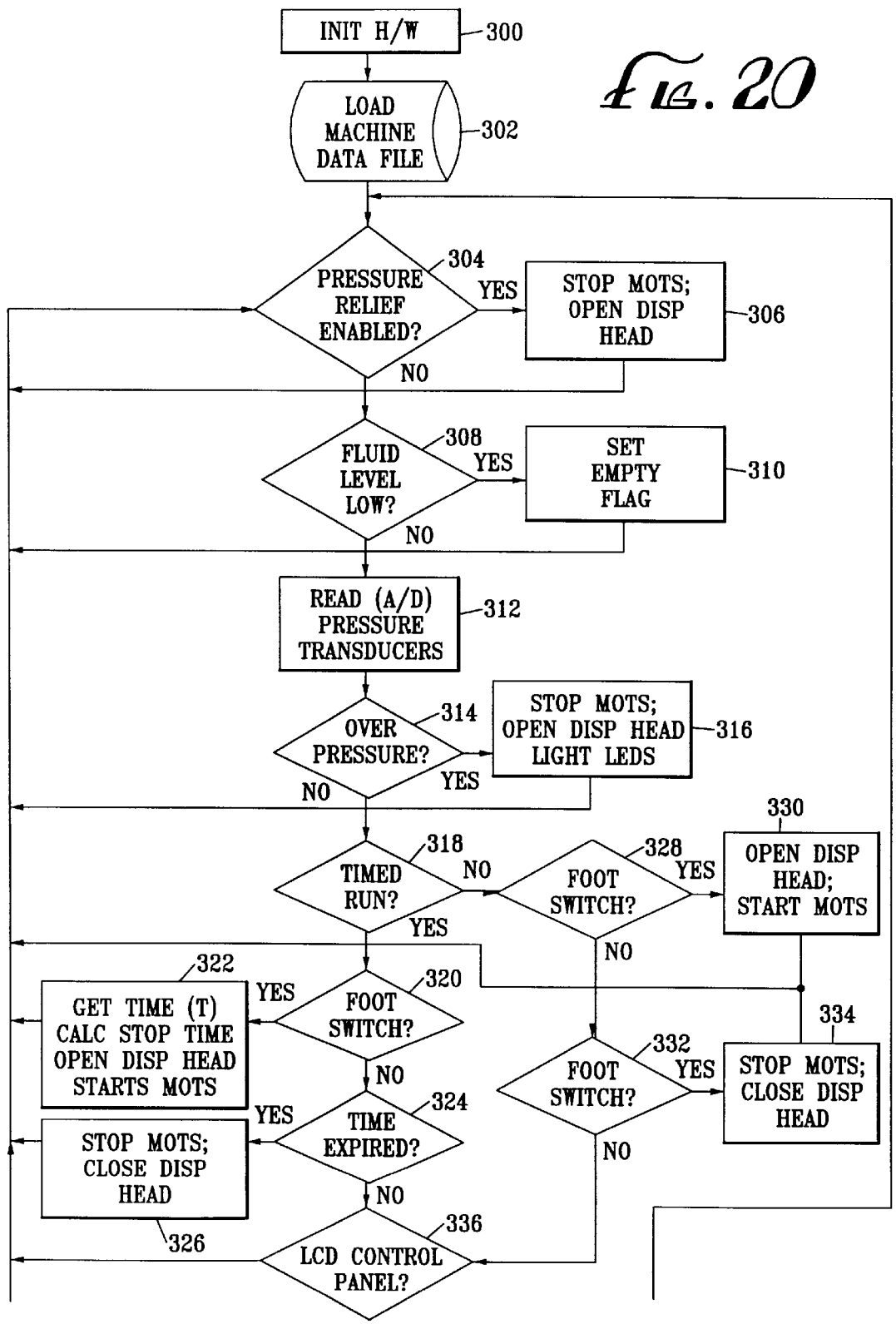

5,857,589

METHOD AND APPARATUS FOR ACCURATELY DISPENSING LIQUIDS AND SOLIDS

TECHNICAL FIELD

The field of the present invention is devices that meter and dispense singular and plural component liquids and solids.

BACKGROUND OF THE INVENTION

Systems for mixing and dispensing singular and multi-component materials are well known in the art. Such systems typically include pumping mechanisms for pumping and metering separate materials, such as a base material and an accelerator material, in a prescribed ratio to a mixing device that thoroughly mixes these materials together. The mixed composition then flows out of a dispensing nozzle directly to the surface or point of application where the composition is desired.

When a curable composition is desired, two or more suitable materials are mixed to interact with each other to create a flowable, curable composition which will set or harden to a non-flowable state. The time required for a curable composition to harden is referred to as the "cure" time and often is a short period of time. Such resulting curable compositions have been used, for instance, as adhesives, sealants and potting materials in a wide variety of industrial applications.

Production environments can impose limitations on how a dispensing device should operate. For example, in a production environment, it is desirable for the curable composition to cure as rapidly as possible so that subsequent production operations can be performed on the production item without having to wait a significant time for curing to occur.

Further, production requirements often include the need to dispense a precise amount of a properly constituted composition. A deviation in the actual ratio of the constituent materials dispensed may alter the strength, viscosity and/or other properties and attributes of the composition. Thus, a dispensing system should dispense the desired ratio and quantity of constituent materials as accurately as possible. In many cases, the desired ratio is expressed as a function of the weight or mass of two constituent components. Nonetheless, the two constituent components are generally supplied to the mixer by volumetric metering pumps which control the volumetric ratio of the two components, rather than their weights or masses. The volumetric ratio fails to account for any changes in density and changes in mass that may occur when the components are subjected to temperature or pressure change.

Also, production items often move along a production line at a set speed. Therefore, the flow rate of the dispensed composition should be kept or maintained as constant as possible so that the time required to dispense the proper amount of composition onto or into the production item remains constant.

An assembly line operation may further require that the composition be dispensed intermittently because the composition is applied to production items that are separated spatially and temporally. Dispensing compositions intermittently may cause a loss of flow control and/or ratio control. During the first few seconds of dispensing a composition, a transient imbalance phenomenon may arise from the elasticity of materials in the dispensing system and/or changing pressures caused by cycling the dispenser. When pressure changes, the volume of stored material between the mixer and the pump changes. In other words, changes in pressure may introduce an error into the weight or mass ratio of the constituent components because a higher pressure results in a component taking less volume than the component would otherwise take, or in an expansion or shrinkage of the hoses, fittings and tubes. The loss of control may result in inaccurately dispensed quantities or ratio of materials. This loss of flow control can occur separately or in addition to the loss of ratio control. A loss of ratio control occurs when the transient imbalance phenomenon causes the dispensing system to dispense too much or too little of one constituent material, thereby resulting in an improperly constituted end product. In other words, even if the ratio control is not lost during the first few seconds of dispensing a composition, the flow control may be lost. Therefore, it is desirous to control both the ratio of constituent materials and the flow rate of dispensing of the resulting composition.

Dispensing machines may be used to create various types of compositions. A dispensing machine may be required to dispense two or more constituent materials to form a first composition and then switch to dispense either the same constituent materials in a different ratio or other constituent materials to form a second composition. Thus, it is desirable for a dispensing machine to change what materials are dispensed, the quantities of materials dispensed and/or the ratio of constituent materials while maintaining the device's ability to control accurately the quantity, ratio, flow rate and other dispensing criteria. Current dispensing systems fail to satisfy these needs and require users to shut down the dispensing machine and go through a lengthy calibration cycle in order to adjust the machine to the viscosity and/or other properties of the constituent materials.

Some dispensing systems include vats capable of holding large amounts of a constituent material. Motor-driven agitators are placed inside the vat to maintain the material homogeneity. As the amount of material held in a vat is consumed, the agitator requires either less velocity or less current to mix the remaining material. However, in present dispensing systems, as the remaining material in a vat decreases, an agitator controlled by conventional means may over-agitate the material, resulting in frothing or the introduction of air bubbles. This frothing of the material could adversely affect the accuracy of the amount of material dispensed.

These concerns and problems may be further exacerbated when a dispensing system attempts to dispense a composition formed by mixing a solid powder with a liquid. Additional issues such as maintaining proper ratios and homogeneity arise.

Ideally, a dispensing system should be able to accurately control the ratio of each constituent material dispensed, the flow rate of each constituent material dispensed, the flow rate of the resulting composition, and the amount of the constituent materials and the resulting composition dispensed and be able to maintain such accuracy over time and various operating conditions. However, present dispensing systems fail to satisfy these attributes.

SUMMARY OF THE INVENTION

A first, separate aspect of the present invention is a device that very accurately dispenses single and plural component liquids and/or solids.

A second, separate aspect of the present invention is a device for dispensing liquids and/or solids under the control of a microprocessor based control system.

A third, separate aspect of the present invention is a device for dispensing single and plural component liquids and/or solids and whose component ratios, shot sizes, continuous flow, flow rate and/or dispense duration are accurately controlled.

A fourth, separate aspect of the present invention is a device for dispensing single and plural component liquids and/or solids wherein the device maintains pressure between the output of the pump and the dispense head.

A fifth, separate aspect of the present invention is a device for dispensing single and plural component liquids and/or solids where the device has self-calibration using a weight scale which feeds data back to the internal computer automatically.

A sixth, separate aspect of the present invention is a device for dispensing single and plural component liquids and/or solids where the device includes feedback components so that the device can accurately adjust and control the pressure, flow rate, quantity and volume of fluids dispensed.

A seventh, separate aspect of the present invention is a device for dispensing single and plural component liquids and/or solids where the device includes agitators and feedback components that allow the device to determine the level of the material remaining in the vats and which controls agitation speed to prevent frothing and aeration of the material.

An eighth, separate aspect of the present invention is a dispensing device for dispensing plural component liquids and powders whereby a powder is dispensed and combined with a single or plural component liquid.

A ninth, separate aspect of the present invention is a machine which is capable of changing ratios of delivered components under software control, both from shot-to-shot and during the time the material is being dispensed.

A tenth, separate aspect of the present invention is a machine which is capable of changing delivered material composition under software control to adjust material pre-cure and part cure characteristics, such as viscosity, color and thixotropic factors.

A eleventh, separate aspect of the present invention is a dispense system that can repeatedly dispense production quantities into parts at an accurate rate and volume.

BRIEF DESCRIPTION OF THE DRAWINGS

The various objects, features and advantages to the present invention will be better understood by considering the Detailed Description of a Preferred Embodiment which follows together with the drawings, wherein:

FIG. 8 is a cross-sectional diagram of a preferred embodiment of the pump stator assembly.

FIG. 13 is a cross-sectional view of the pump stator assembly of FIG. 8 and illustrates the flow pattern of fluids passing through the pump stator assembly.

FIGS. 20–23 are software flowcharts for controlling aspects of the dispensing system.

DESCRIPTION OF THE PREFERRED EMBODIMENT

Figure 1:
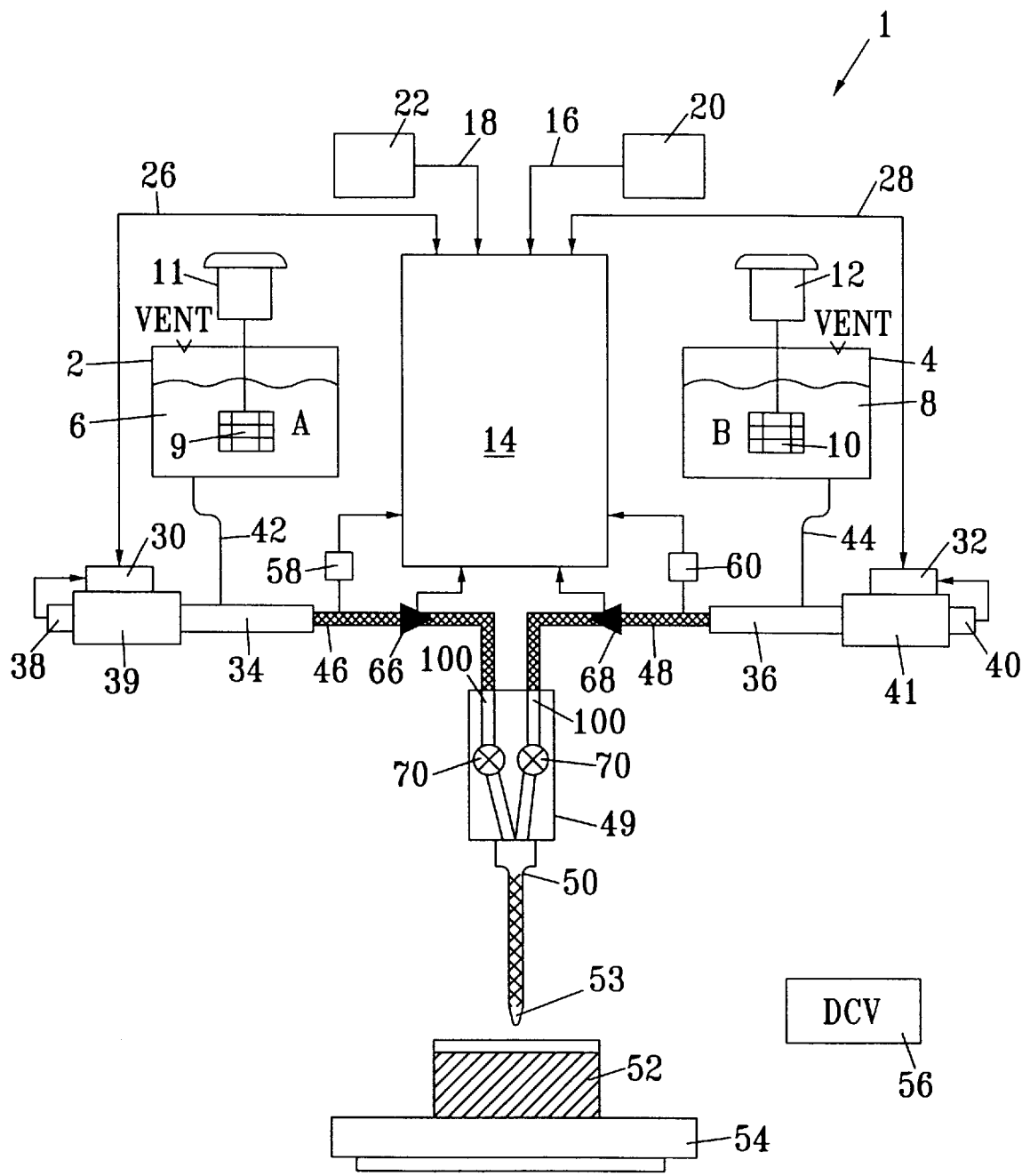
FIG. 1 is a block diagram of a preferred embodiment of a dispensing system which dispenses a single or plural component fluid.

FIG. 1 illustrates a block diagram of a dispensing system 1 which dispenses a single or plural component fluid. In FIG. 1, the dispensing system 1 has a plurality of vats 2, 4, each of which holds a fluid 6, 8 that is a constituent material of the desired final product. Agitators 9, 10 stir the fluids 6, 8 in order to maintain the fluids as homogeneously as possible. The dispensing system 1 has a master control unit 14 which may be a CPU, microprocessor, microcontroller, arithmetic logic unit, ASIC, field programmable gate array, or other logic control circuit. The master control unit 14 receives data and commands via data interconnects 16, 18 from a user input device 20 and/or a programming input device 22. The user input device 20 may be a keypad, buttons, switches, barcode reader, or other input device. Depending on the input, the master control unit 14 controls various aspects of the dispensing system 1. For example, the master control unit 14 has lines 26, 28 for transmitting commands and receiving data from pump controllers 30, 32 which in turn direct and manage pumps 34, 36. The control unit 14 calculates desired pump parameters, such as acceleration, speed and duration, based on data entered through aforementioned user input devices and from data resident in the software and hardware of the control unit. Primary items of information stored in the resident software are the dispense volume of each pump rotation, and the ratio between motor rotation and pump rotation. The software then calculates the number of motor rotations to deliver the desired quantity of material, including velocity or rotational speed. If one revolution of the pump outputs a known volume of a fluid, the pump constant, the control unit 14 calculates the tick count to control the number of revolutions and partial revolutions the pump makes and thus, direct the quantity of the fluid to be dispensed. The desired pump parameters are then downloaded to the pump controllers 30, 32, via the data lines 26, 28 and stored. A signal to begin a cycle is sent simultaneously to each pump controller 30,32 by the control unit 14, both pumps 34, 36 activate under their respective programs. The motor controllers 30, 32 then count the ticks received from absolute position encoders 38, 40 over time to manage the rotational speed or acceleration of the pumps 34, 36. The absolute position encoders 38, 40 are coupled mechanically to the shafts of the motors 39, 41 and may operate optically, mechanically, electrically or magnetically. The encoders 38, 40 count tick marks to detect the position of the shafts as they rotate. The encoders 38, 40 send pulses (i.e., a number of ticks over time) representing the shaft position information to the motor controllers 30, 32. As later described in FIG. 17, the pulses enter a control circuit 190 (within the motor controllers) and are used by the control circuit 190 to control power drivers 200 and the motors 39, 41. Thus, the pulses from the encoders are used by the motor controllers to adjust or fine tune the operation of the motors 39, 41. The motor controllers 30, 32 may send status and other information including encoder information to the master control unit 14. Thus, the motors 39, 41 and in turn the pumps 34, 36 are controlled by a pump control system including the master control unit 14, the motor controllers 30, 32 and the encoders 38 and 40.

If a revolution of the pump outputs a known volume of a fluid, the pump control system, either the master control unit 14 or the motor controller depending on which device is to have feedback control in a particular design, can use the encoder tick measurement of the number of revolutions and partial revolutions made by the pump and thus, calculate the expected volume of the fluid dispensed. The master control unit 14 may count the ticks from the encoders 38, 40 over time to determine the rotational speed or acceleration of the pumps 34, 36. Thus, the pump control system including the encoders 38, 40 measure pump displacement and rate to act as pump movement sensors.

The action of the pumps 34, 36 draws fluids 6, 8 into the pumps through vat fluid lines 42, 44. The fluids 6, 8 pass into the pump fluid lines 46, 48 and into a dispense head 49 having a separate chamber 51 for each pump fluid line 46, 48. From the dispense head 49, the fluids pass into a static mixer tube 50. The static mixer tube 50 has internal projections that mix the fluids 6, 8 together and dispense an end product 52 through the output nozzle 53 of the static mixer tube 50. The end product 52 may be dispensed onto a scale 54 which weighs the end product. The dispensing system 1 receives DC power from a DC power supply 56.

Thus, the dispensing system as shown in FIG. 1 is a two-channel system, where each channel handles the dispensing of one fluid. The first channel (channel A) includes the vat 2, vat fluid line 42, pump 34, pump controller 30, encoder 38, pump fluid line 46 and dispense head 49. The second channel (channel B) comprises the vat 4, vat fluid line 44, pump 36, pump controller 32, encoder 40, pump fluid line 48 and dispense head 49. The dispensing system may also be modified to include additional channels and include additional vats, agitators, pumps, fluid lines and other components as desired to dispense three or more component mixtures.

Pressure transducers 58, 60 send feedback information about the pressure in the pump fluid lines 46, 48 to the master control unit 14 so that the master control unit 14 can monitor the pressure in the pump fluid lines 46, 48 from the output of the pumps 34, 36 to the dispense head 49. The ability to maintain a constant pressure from the output of each pump 34, 36 to the dispense head 49 helps assure that the fluid is compressed uniformly and constantly so that an accurate amount of fluid is dispensed. Additionally, if there is a blockage or malfunction, the pressure transducer will signal a preset overpressure situation, and the system will shut down. Similarly, flow meters 66, 68 measure the flow rates within the pump fluid lines 46, 48 and transmit flow rate information to the master control unit 14, thereby allowing the master control unit 14 to monitor the fluid flow rates. Should the flow rates differ from calibration data, the system can be shut down and an error reported.

The dispense system can also use information from the pump controllers 30, 32 and the flow meters 66, 68 and other feedback sensors to check the pump and plumbing for leaks and trapped air. Appropriate error messages may be issued to the user to insure optimum performance. The dispense system may change the delivered material composition, from shot-to-shot or during the time the material is being dispensed, in order, for example, to adjust material pre-cure and post cure characteristics such as the viscosity, color and thixotropic factors of the material.

The dispense head 49 has positive cutoff valves 70 which are symbolically shown in FIG. 1. The positive cutoff valves 70 are controlled by the master control unit 14 and serve to cut off the flow of fluids in the dispense head 49 whenever appropriate (i.e., when the dispense cycle is completed). The control lines between the master control unit 14 and the positive cutoff valves 70 are not shown in FIG. 1.

Agitators 9, 10 in the vats 2, 4 are driven by agitator motors 11, 12. The agitators 9, 10 are illustrated as stir paddles but may be any type of agitator well known in the art. The agitators 9, 10 run at a constant desired speed. However, as the level of the fluid in a vat 2, 4 falls, less current is required to drive the agitator at the same speed. The master control unit 14 can detect the reduced current flow and determine the amount of fluid remaining in the vat. Alternately, the system can be made to maintain a constant current instead of constant motor speed. An additional encoder and motor controller similar to those previously described are coupled to each agitator motor so that the motor controller (and master control unit 14) can receive rotational position information from the agitator motors. Accordingly, the master control unit 14 can determine the rotational speed of each agitator to determine the level of fluid remaining in the vat. As the fluid level in the vat falls and as the current flow to the agitator motor is kept constant, the rotational speed of the agitator motor increases. The master control unit 14 can measure the rotational speed of the agitator motor to determine the level of fluid remaining in the vat. The master control unit 14 can also decrease the current to the agitator motor when the master control unit 14 detects that the motor speed has increased. Each vat 2, 4 has a float connected to a normally closed switch. When the fluid level falls below a certain level, the float falls and triggers the switch to open.

The dispensing system of FIG. 1 operates as follows:

1. The user calibrates the dispensing system (as described later) and the dispensing system calculates how much the pump motors must rotate in order to dispense a unit weight of a fluid or mixture.
2. The user enters program mode to set up shot parameters.

3. In response, the master control unit 14 queries the user for various parameters of the dispense cycle.

4. The user inputs the desired ratio of component fluids, the shot size of the end product, and either the flow rate or the time duration of the dispense cycle.

5. The master control unit 14 determines the proper pump parameters in order to feed constituent materials at the desired rate and downloads instructions to the pump controllers 30, 32.

6. The user initiates a dispense cycle by depressing a foot pedal, button or switch. The system can also be initiated by a signal from a pressure transducer to dispense more fluid.

7. The master control unit 14 starts the dispense cycle by opening the positive cutoff valves 70 in the dispense head 49 and by starting the pumps 34, 36.

8. The pump controllers 30, 32, flow meters 66, 68 and pressure transducers 58, 60 feed back information about the rotational speed of the pumps, flow rates and pressures to the master control unit 14. The pump controllers 30, 32 self monitor for accuracy and feed errors back to the master control unit 14. The master control unit 14 uses this information to monitor the pump for correct rotational speed, flow rates and pressures.

9. The pressure transducers 58, 60 check for blockages in the pump fluid lines 46, 48 and shut down the dispensing system to prevent damage to the system if the detected pressure exceeds a pressure limit set point (i.e., an overpressure condition).

10. The pumps 34, 36 and the positive cutoff valves 70 maintain the proper pressure in pump fluid lines 46, 48 by functioning as positive cutoffs between shot cycles. When the dispense cycle ends, the master control unit 14 closes the positive cutoff valves 70 and stops pumps 34, 36.

11. The master control unit 14 analyzes received information and determines whether a dispense cycle was successfully completed.

12. Should there be a need to modify the pump function to insure correct dispense characteristics, the master control unit 14 sends new commands to the pump controllers 30, 32.

13. Steps 6–12 are repeated as needed for different quantities, ratios and durations.

Figure 2:
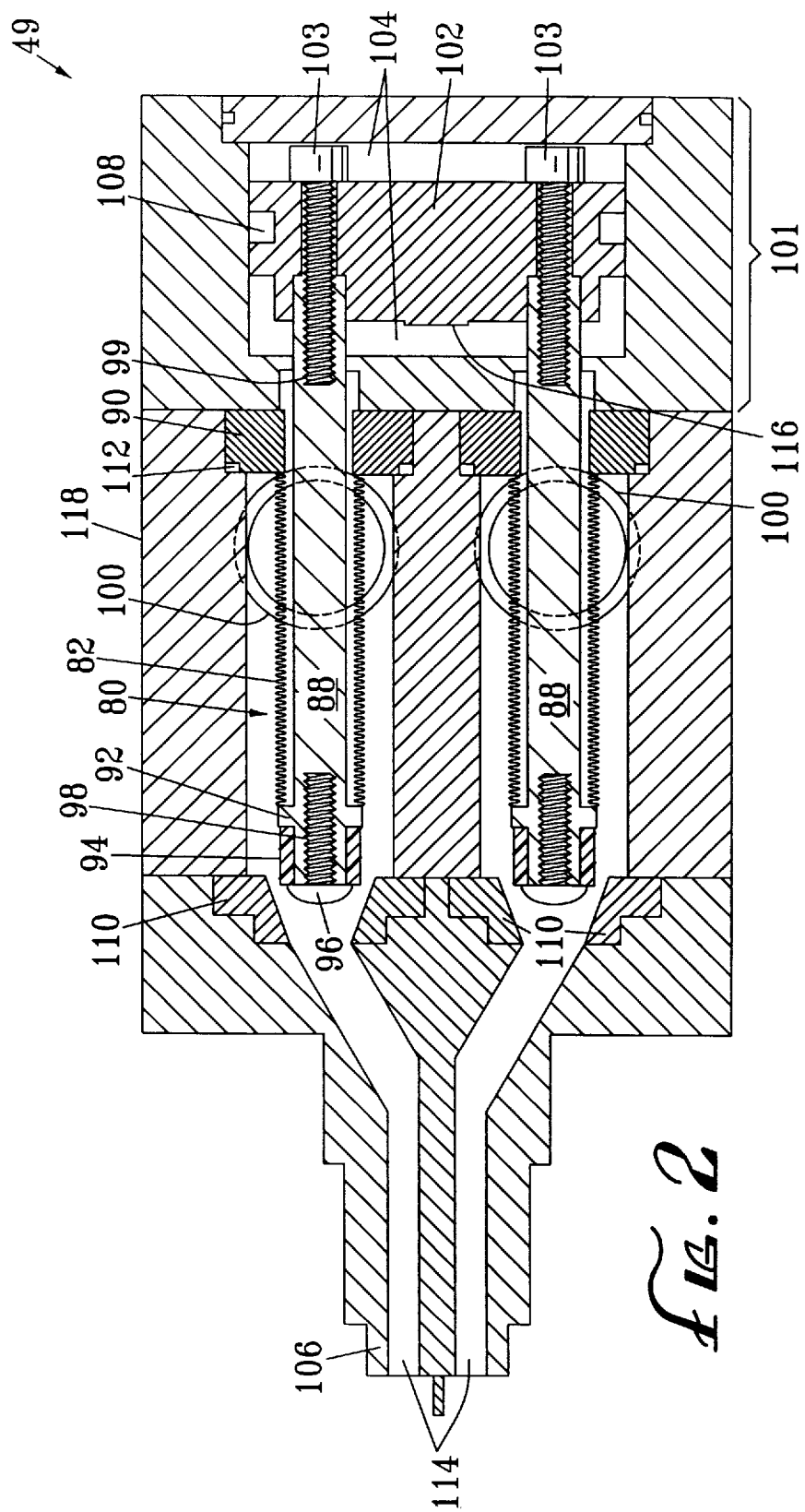
FIG. 2 is a cross-sectional diagram of a dispense head in the opened position.
Figure 4:
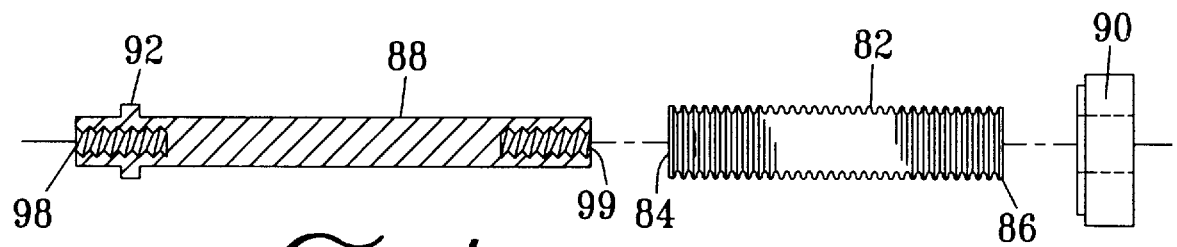
FIG. 4 is an exploded cross-sectional view of the bellows assembly.
Figure 5:
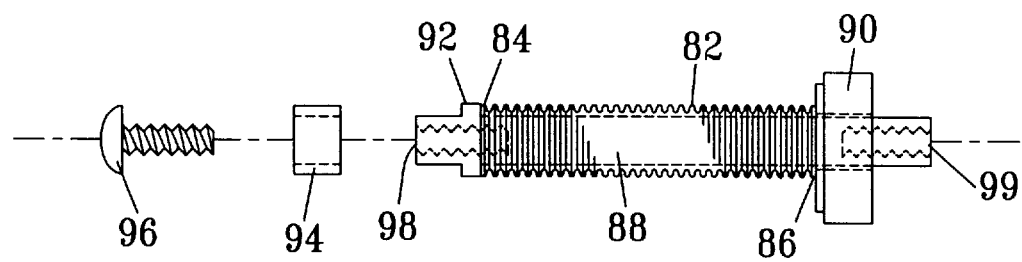
FIG. 5 is a partially exploded cross-sectional view of the bellows assembly.
Figure 7:
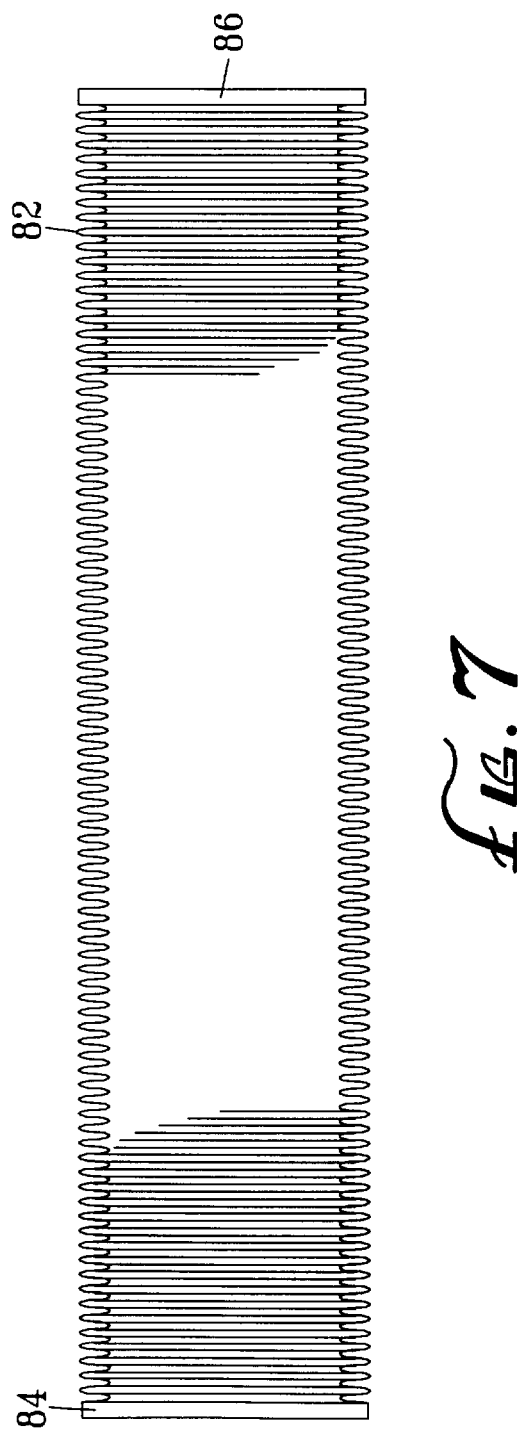
FIG. 7 is a cross-sectional view of the bellows.

FIG. 2 is a cross-sectional diagram of a dispense head 49. The dispense head 49 is a combination manifold/on-off valve that controls the flow of fluids. The dispense head 49 includes a bellows assembly 80. FIG. 4 illustrates an exploded cross-sectional view of the bellows assembly 80 and FIG. 5 depicts a cross-sectional view of a partially constructed bellows assembly 80. The bellows assembly 80 includes a bellows 82. The bellows 82 is a compressible corrigated metal alloy sleeve that is shown in greater detail in FIG. 7. As shown in FIG. 7, the bellows 82 has two ends 84, 86. Returning to FIGS. 4 and 5, a valve rod 88 is inserted into a center hole of the bellows 82. The bellows 82 slides freely along the length of the valve rod 88. The valve rod 88 is also inserted into an aperture of a rod seal ring 90. The rod seal ring 90 is not affixed to the valve rod 88 and is also free to slide back and forth along the length of the valve rod 88.

Figure 6:
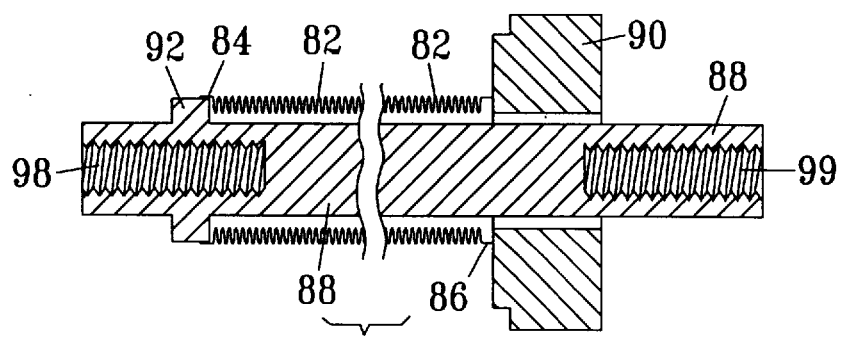
FIG. 6 is a cross-sectional view of the bellows assembly as mounted to the valve rod and rod end.

FIG. 6 is a cross-sectional view of the bellows assembly 80 and shows how the bellows assembly 80 is affixed to the valve rod 88 and the rod seal ring 90. One end 84 of the bellows 82 is hermetically sealed to the raised lip 92 of the valve rod 88 by welding, soldering, brazening or other means. The other end 86 of the bellows 82 is similarly hermetically sealed by welding, soldering, brazening or other means to the rod seal ring 90. Thus, as the valve rod 88 extends and retracts from the rod seal ring 90, the valve rod 88 alternately compresses and expands the bellows 82.

A seat/rod seal 94 slides over and around an end of the valve rod 88 and abuts the raised lip 92 of the valve rod 88. A retaining screw 96 enters the opening of the seat/rod seal 94 and screws into mating threads 98 of the valve rod 88. The retaining screw 96 holds the seat/rod seal 94 in place.

Figure 3:
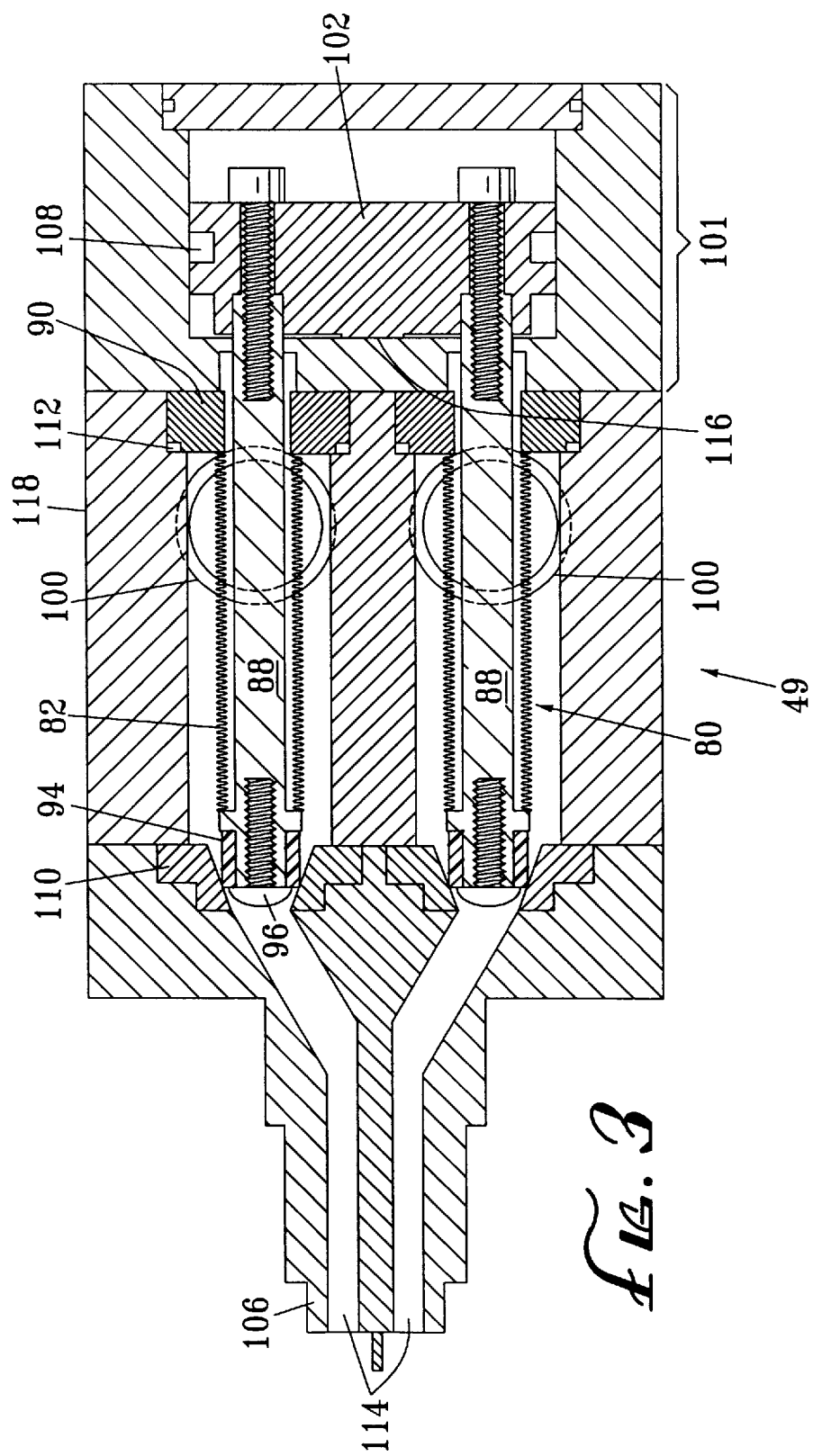
FIG. 3 is a cross-sectional diagram of a dispense head in the closed position.

Returning to FIG. 2, each bellows assembly 80 is shown as mounted in a separate chamber 51 within the dispense head 49. The dispense head 49 has two inlets 100. The inlets 100 receive fluids 6, 8 from the pump fluid lines 46, 48, and go perpendicularly into the illustration of FIG. 2. A pneumatic valve actuator includes air cylinder 101 having a piston 102 which moves freely within the air cylinder 101. Screws 103 pass through passages in the free piston 102 and engage the mating screw threads 99 of the valve rods 88 to attach the valve rods 88 to the air cylinder 101. Each air chamber 104 of the air cylinder 101 has at least one air port (not shown) that allows air to be pumped into or out of the chamber. As shown in FIG. 2, the piston 102 is in its rightmost position (i.e., in a position furthest away from the valve nose 106). The piston 102 has an O-ring groove 108 for holding a dynamic O-ring which acts as an air seal between chambers of the air cylinder 101. When air is selectively pumped into the chambers 104 such that the air pressure in the rightmost chamber sufficiently exceeds the air pressure in the leftmost chamber, the piston 102 travels leftward towards the valve nose 106. This leftward motion of the piston 102 pushes the valve rod 88 leftward and expands the bellows 82. When the piston 102 extends the valve rods 88 leftward, the seat/rod seal 94 compresses into the tapered bore of the valve seat 110, thereby closing off the flow of fluids in the dispense head 49. The rod seal ring 90 is held in place within a cavity of the dispense head 49 and has an O-ring groove 112 for holding a static O-ring. The static O-ring acts as a fluid seal to prevent fluid in the dispense head 49 from leaking around the rod seal ring 90. The resulting closed position configuration is shown in FIG. 3. Instead of a pneumatic actuator such as the air cylinder, the system may utilize an electronic actuator such as a solenoid to move the valve rods 88. The system may also use any other actuator well known in the art.

The bellows assembly 80 in FIG. 3 is in the closed position because there is no gap between the seat/rod seal 94 and the valve seat 110, thereby preventing fluid from flowing into the exit passages 114 and into the static mixer tube 50. A raised surface 116 on the piston 102 prevents the piston surface from completely engaging the inner surface of the air cylinder 101 when the piston 102 is in its leftmost position. The raised surface 116 maintains at least some minimal air gap between part of the piston surface and the air cylinder surface so that the piston surface does not "stick" to the air cylinder surface.

To open the bellows assembly 80, the piston 102 is moved away from the valve nose 106 so that the valve rod 88 moves relative to the rod seal ring 90. This relative movement of the valve rod 88 to the rod seal ring 90 compresses the bellows 82. The resulting configuration of the bellows assembly 80 is the open position shown in FIG. 2 where the gap between the seat/rod seal 94 and the valve seat 110 permits fluid to pass into the exit passages 114. Hence, the fluid coming from the inlets 100 may enter the dispense head 49 and flow out of the exit passages 114 of the dispense head 49. The opening and closing of the bellows assembly 80 act as a positive cutoff valve 70.

The valve seat 110 may be made of stainless steel or other suitable material. The seat/rod seal 94 may be formed of teflon or other suitable material that is deformable and yet highly impervious to chemicals. The valve body 118, valve nose 106, piston 102 and air cylinder 101 are made of aluminum or other suitable material.

The dispense head 49 has no dynamic sealing surfaces. The primary sealing mechanism is the bellows assembly 80. A significant advantage of such a dispense head is that none of the components which come in contact with the fluids being dispensed also come into contact with any moving or dynamic sealing surfaces. Potential contamination may arise from moisture in the air which can cause the fluids to crystallize, or from contamination in the fluids themselves. Therefore, the dispense head of FIG. 2 advantageously eliminates movement between any mechanical components of the dispense head 49 in the valve chamber and any fluid seal, thereby eliminating the possibility that a seal would be destroyed by the fluids or by abrasive contamination in the fluids.

FIG. 8 is a diagram of the pump stator assembly 130 of the progressive cavity pumps 34, 36. The pump stator assembly 130 is essentially comprised of multiple interlocking pressure sections 140 that have been inserted into a metal hollow tube housing 132 with a locking end cap at both ends. A threaded front end cap 142 receives the last pressure section 140 at the front end of the stator assembly 130. A retainer 144 attaches to tube housing 132 and the last pressure section 140 at the rear end of the stator assembly 130. A threaded rear end cap 146 then attaches to the tube housing 132.

Figure 9:
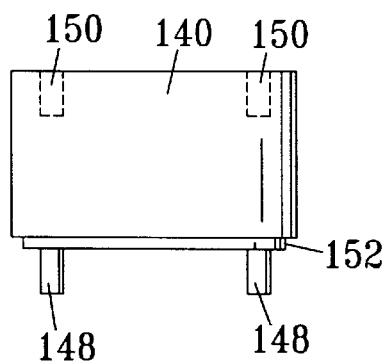
FIG. 9 is a side view of a pressure section of the pump stator assembly of FIG. 8.
Figure 10:
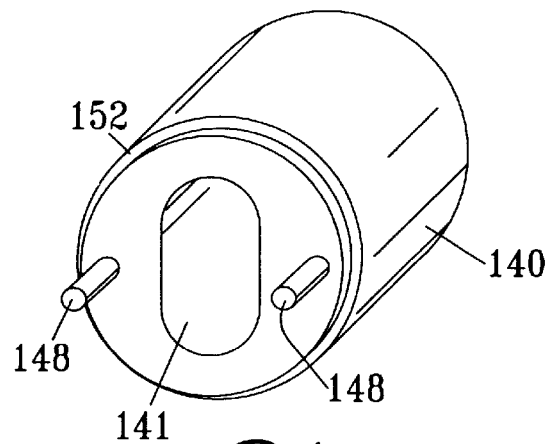
FIG. 10 is a perspective end view of a pressure section of FIG. 9.
Figure 11:
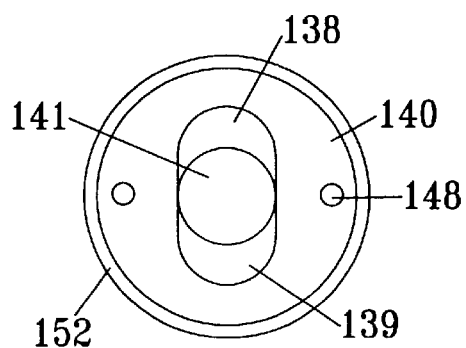
FIG. 11 is an end view of a pressure section of FIG. 10.
Figure 12:
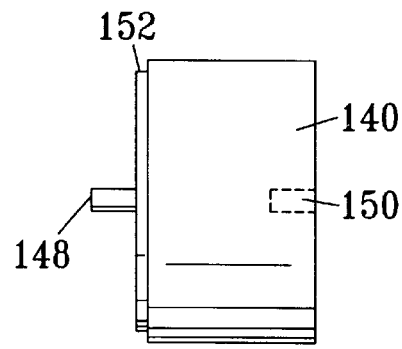
FIG. 12 is another side view of a pressure section of FIG. 9.

FIGS. 9–12 illustrate different views of a pressure section 140 of the pump stator assembly 130. FIG. 9 is a side view of the pressure section 140; FIG. 10 is a perspective end view of the pressure section 140; FIG. 11 is an end view of the pressure section 140 of FIG. 10; FIG. 12 is another side view of the pressure section 140; FIG. 13 is a cross-sectional view of the pump stator assembly of FIG. 8 and illustrates the resulting double helix flow pattern of fluids passing through the pump stator assembly.

Each pressure section 140 is made of teflon or other suitably deformable, durable, yet highly chemically resistant and abrasion resistant material. Each pressure section 140 has a concentric 360 degree double helix bore 141 running through its center. A first helix thread 138 and a second helix thread 139 of the bore are shown in FIG. 13. The helix threads wind down the length of the bore 141, are opposed to each other by 180 degrees and cross each other every 180 degrees. Essentially, each pressure section 140 has one crossing of the double helix threads. To manufacture the double helix bore, a solid teflon rod is provided, a circular bore is drilled through the rod, and two helix threads are carved out of the bore of the rod.

Each pressure section 140 has pins 148 which mate with holes 150 of an adjacent pressure section 140 to interlock the pressure sections together and to maintain the radial alignment between adjacent pressure sections. The pressure section 140 has an O-ring groove 152. An O-ring (not shown) made of teflon or other suitably deformable yet durable material fits into the O-ring groove 152 between adjacent pressure sections to seal each pressure section. When the end caps 142, 146 are tightened to compress the pressure sections 140 together, the O-rings expand outward against the walls of the metal tube housing 132.

Figures 14, 19:
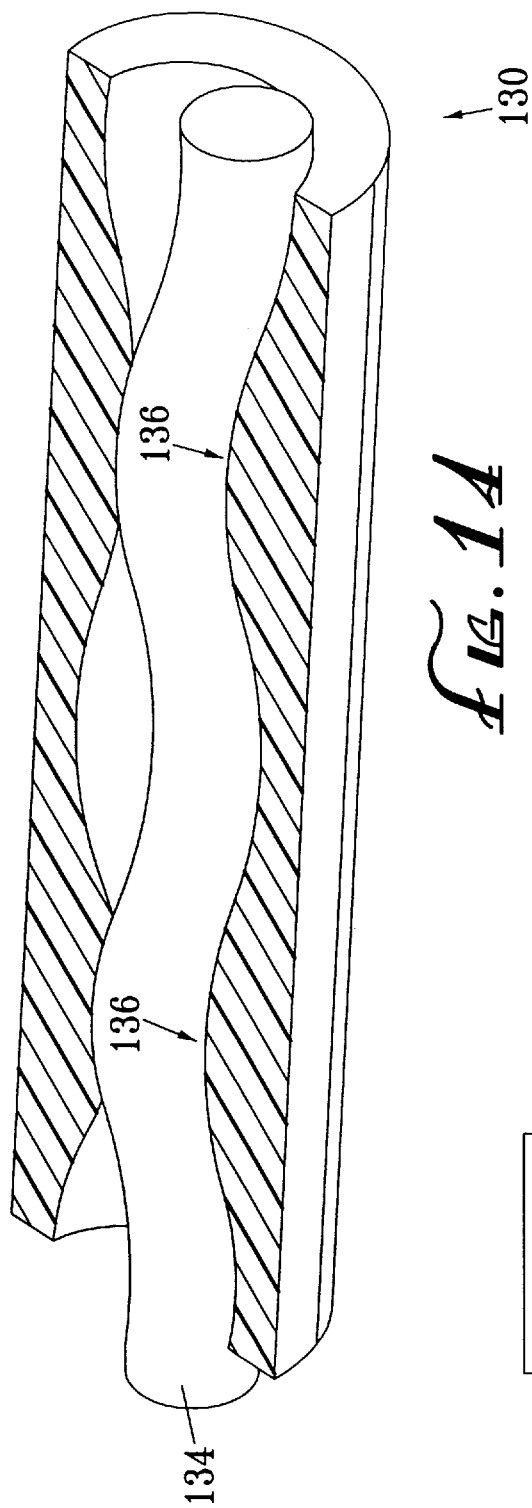
FIG. 14 is a cutaway view of a partial pump stator assembly having a single helix rotor within the double helix bore.
FIG. 19 is a diagram showing how FIGS. 20–23 connect to create a software flowchart for controlling aspects of the dispensing system.
Figure 15:
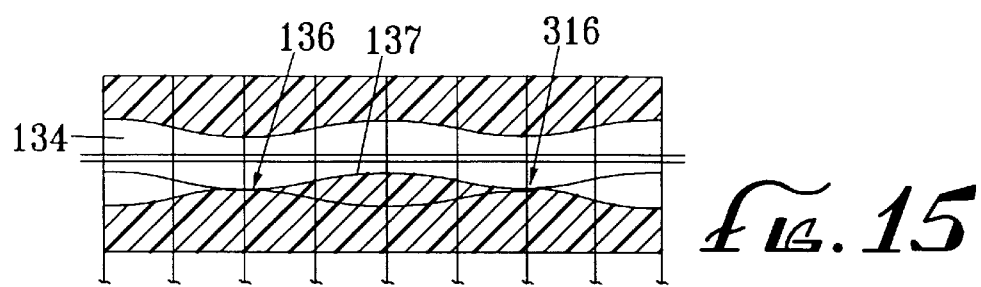
FIG. 15 is a cross-sectional view of a partial pump stator assembly and rotor.
Figure 16:
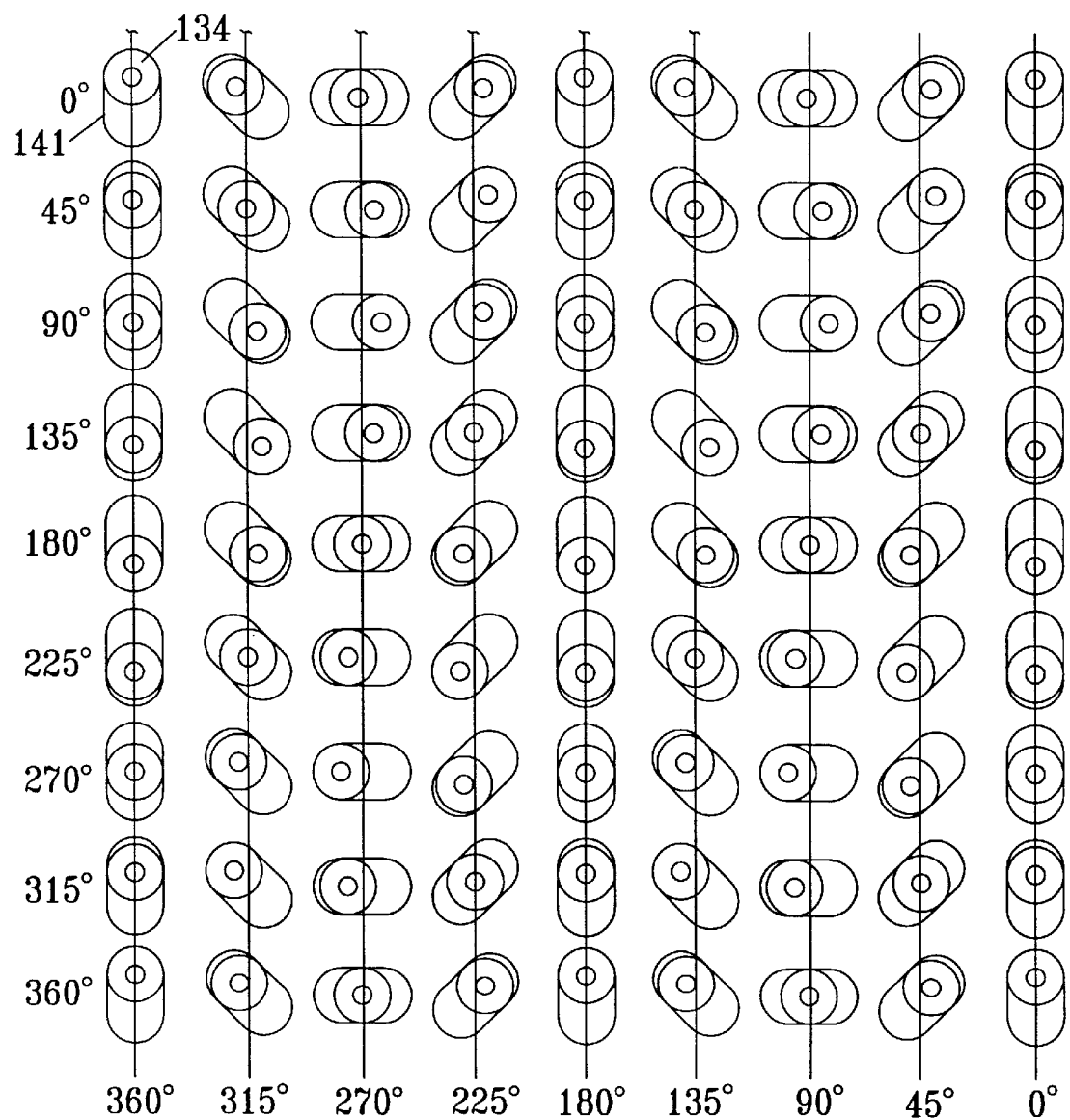
FIG. 16 is a diagram showing the position of the single helix rotor as the rotor rotates within the double helix bore of a pump stator assembly.

A rotor or screw 134 having a single helix thread is inserted through the double helix bore 141 of the interlocked pressure sections 140. The interaction of the single helix rotor 134 and the double helix bore 141 creates the pumping action. FIGS. 14–16 illustrate how the single helix rotor operates within the double helix bore of a pump stator assembly. FIG. 14 is a cutaway view of a partial pump stator assembly having a single helix rotor within the double helix bore.

Referring to FIG. 14, the single helix thread of the rotor 134 engages portions of the double helix threads 138, 139 to create sealing lines 136. Fluid may be carried between a pair of sealing lines 136. As the rotor 134 turns within the double helix bore 141, the sealing lines 136 move down the length of the bore, thereby transporting the fluid and creating a progressive cavity pump. The desired total number of turns in the double helix threads of the bore of the stator pump assembly 130 depends on the desired pump characteristics.

FIG. 15 is a cross-sectional view of a rotor in a partial pump stator assembly (where the lines through the pump stator assembly do not represent the pressure sections but are used to correlate FIG. 15 to FIG. 16). FIG. 15 illustrates the sealing lines 136 formed by the contacts between the rotor 134 and the double helix threads of the bore 141 as well as the cavity 137 formed between adjacent sealing lines. FIG. 16 is a diagram showing the position of the single helix rotor as the rotor rotates within the double helix bore of a pump stator assembly.

The bore 141 of the pressure sections 140 has an interference fit with the rotor 134. That is, although the maximum outer dimension of the rotor 134 exceeds the minimum inner dimension of the bore 141 of the pressure sections 140, the flexibility of the pressure sections 140 permits the rotor to fit within the bore 141. The interference fit creates a seal between the rotor 134 and the bore 141 by eliminating the gap between the rotor and the bore. Lack of a gap means that fluids are prevented from leaking back through the bore 141 of the pump. When fluid leaks back through the bore 141, the pump operates inefficiently and inaccurately. The interference fit also results in minimized slippage of the rotor 134 relative to the bore 141. Thus, the interference fit results in a positive displacement pump wherein every rotation of the pump outputs an accurate and known volume of fluid. Because the pump is a constant displacement pump, the pressure of the system rises or falls to a steady state depending on the viscosity and flow rate of the material being pumped, and the dynamic back pressure of the system through which the fluid is dispensed. As this pressure is different for each output requirement, it is imperative that the pressure be maintained between cycles to insure accurate shot-to-shot dispense reproducibility.

By contrast, as pressures change unexpectedly in prior art devices, the fluid is compressed differently which results in a non-constant amount of fluid being dispensed. This problem with non-constant pressures is prevalent in prior art systems because as the dispense rate changes, the pressure changes. For example, a rotor that moves within a smooth bore may suffer from leakage and pressure changes. In such a pump, if fluid is poured into the bore having the rotor, the fluid will flow down the thread of the rotor, down the bore and out of the pump. The sealing lines of the double helix pump help prevent fluid from "pouring" through the pump.

Notably, each pressure section 140 can maintain a constant pressure even when the rotor 134 is static. When the rotor 134 rotates, the fluid being dispensed is transported through the pump stator assembly 130 from one pressure section to the next. The resulting progressive cavity pump is able to maintain high pressure, is volumetrically accurate and has a pulseless output flow. The pump is able to maintain constant volume of the fluids being dispensed, thereby insuring the accuracy of the dispensing characteristics. The flexible nature of the interlocked pressure sections and the metal hollow tube housing 132 of the pump also help limit the tendency of the rotor 134 to nutate or twist during rotation of the rotor 134.

Figure 17:
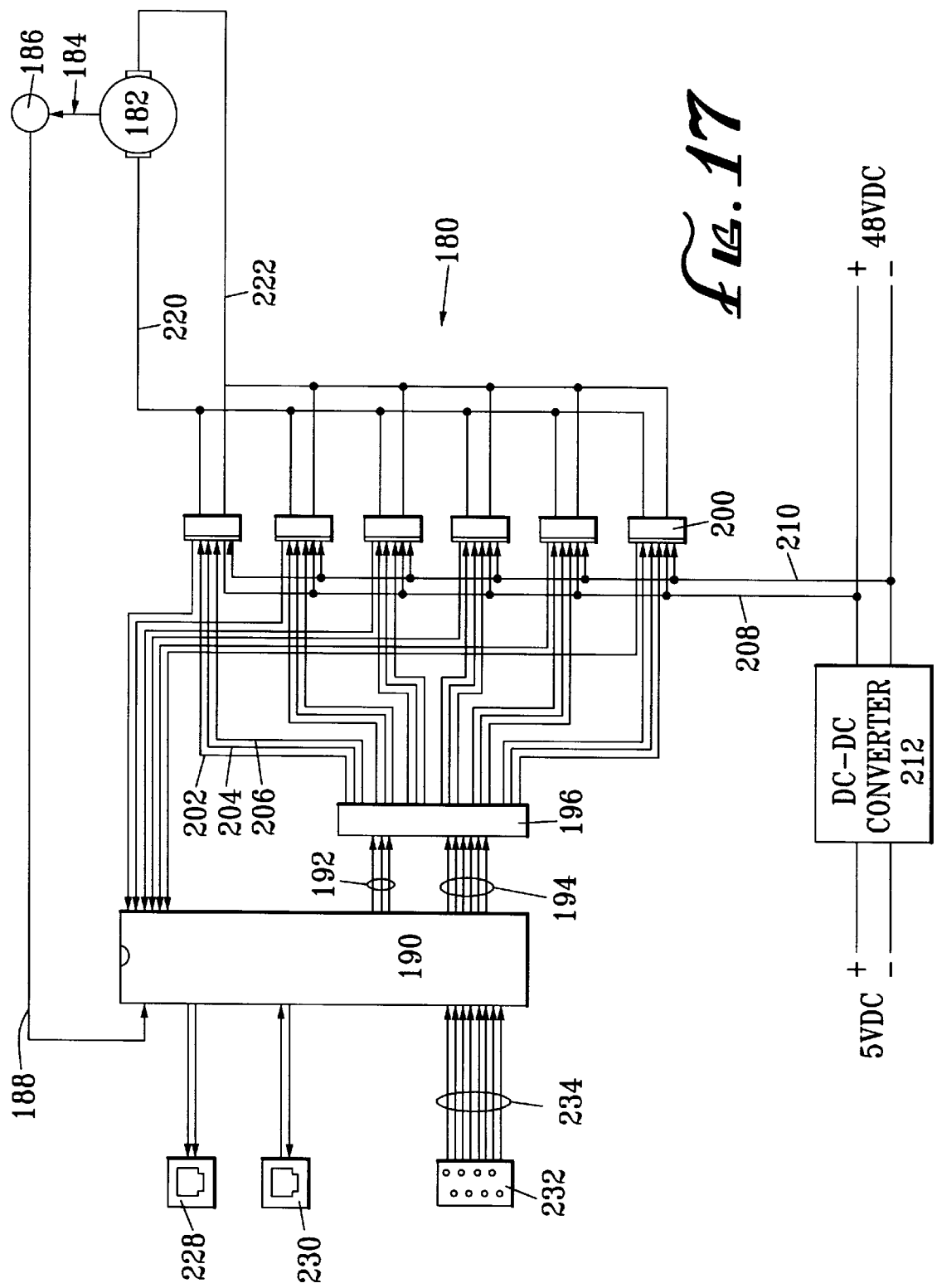
FIG. 17 is an electrical block diagram of a preferred embodiment of a motor controller.

FIG. 17 is an electrical block diagram of a preferred embodiment of the motor controller 180 of the present invention. The motor controller 180 may be used to drive any motor described herein. The motor 182 is a permanent magnet DC brush or brushless motor and in particular, a 48 volt ½ horsepower motor. The motor 182 is mechanically connected to an encoder 186. The encoder detects the absolute position of the motor shaft and sends this position information 188 to the control circuit 190. The control circuit 190 can use the position information to determine the rotational speed or acceleration of the motor. The control circuit 190 sends various control signals 192 and "ready" control signals 194 to a multiplexor 196. The ready signals 194 allow the control circuit 190 to turn off any specific power driver 200 if the power driver suffers a non-catastrophic failure. Signals from the multiplexor 196 pass to various power drivers 200. A DC-to-DC converter 212 converts a 48 volt power supply to 5 volts which runs various electronics in the system and also sends 48 volts to the power drivers 200. The power drivers 200 are semiconductor devices that use low level inputs (i.e., signals from the multiplexor 196) to control relatively high current level outputs (i.e., lines 220, 222) to control the motor 182.

Three of the input signals are the brake control signal 202, direction control signal 204 and the pulse width modulation (PWM) control signal 206. The brake control signal 202 causes the power drivers 200 to short the lines 220, 222 going to the motor 182 which uses back electromotive force (emf) to dynamically brake or stop the motor 182 as quickly as possible. The direction control signal 204 tells the power drivers 200 whether to reverse the direction of the motor 182. The pulse width modulation control signal 206 carries a train of pulses and the power drivers 200 count the number of pulses over time. As the number of pulses per unit time increases, the power drivers 200 output increasingly higher voltages up to a maximum of 48 volts to speed up the motor 182 accordingly. As the number of pulses per unit time falls, the power drivers 200 reduce the output voltage to slow down the motor 182.

The power drivers 200 have current feedback lines 224 that return current flow information to the control circuit 190. The control circuit 190 uses the current flow information to see how hard the motor 182 must work to maintain a given speed. This information can be used to derive the torque.

The control circuit 190 may receive information, analog or digital, from devices connected to the monitor port 228. For example, a temperature sensor may be connected to the monitor port 228 to provide temperature data to the control circuit 190. A RS232 control port 230 facilitates communication between the control circuit 190 and the master control unit 14 for motor information and commands. The RS232 control port 230 allows the system to monitor the motor controller 180 for such information as the desired motor speed, actual motor speed, desired number of total motor revolutions, actual number of total motor revolutions, and current flow to each of the power drivers 200. A DIP switch 232 may optionally be used to manually set the speed of the agitators which would otherwise be adjustable by the control circuit 190. The DIP switch settings are sent over lines 234 to the control circuit 190.

Thus, the dispense system has various communication abilities. The dispense system may be attached to an outside telephone line, allowing service personnel at a remote location to monitor the system's performance and diagnose any malfunctions. A bar code reader may be attached to the dispense system where the system uses the bar code reader to identify a part, automatically configures itself to dispense according to a known program, and displays an image of the part so the user can verify that the program is the correct program for the displayed part. The system also may monitor material utilization, store in memory the total material used, and communicate with a manufacturing network to provide material use information to an external computer system.

Figure 18:
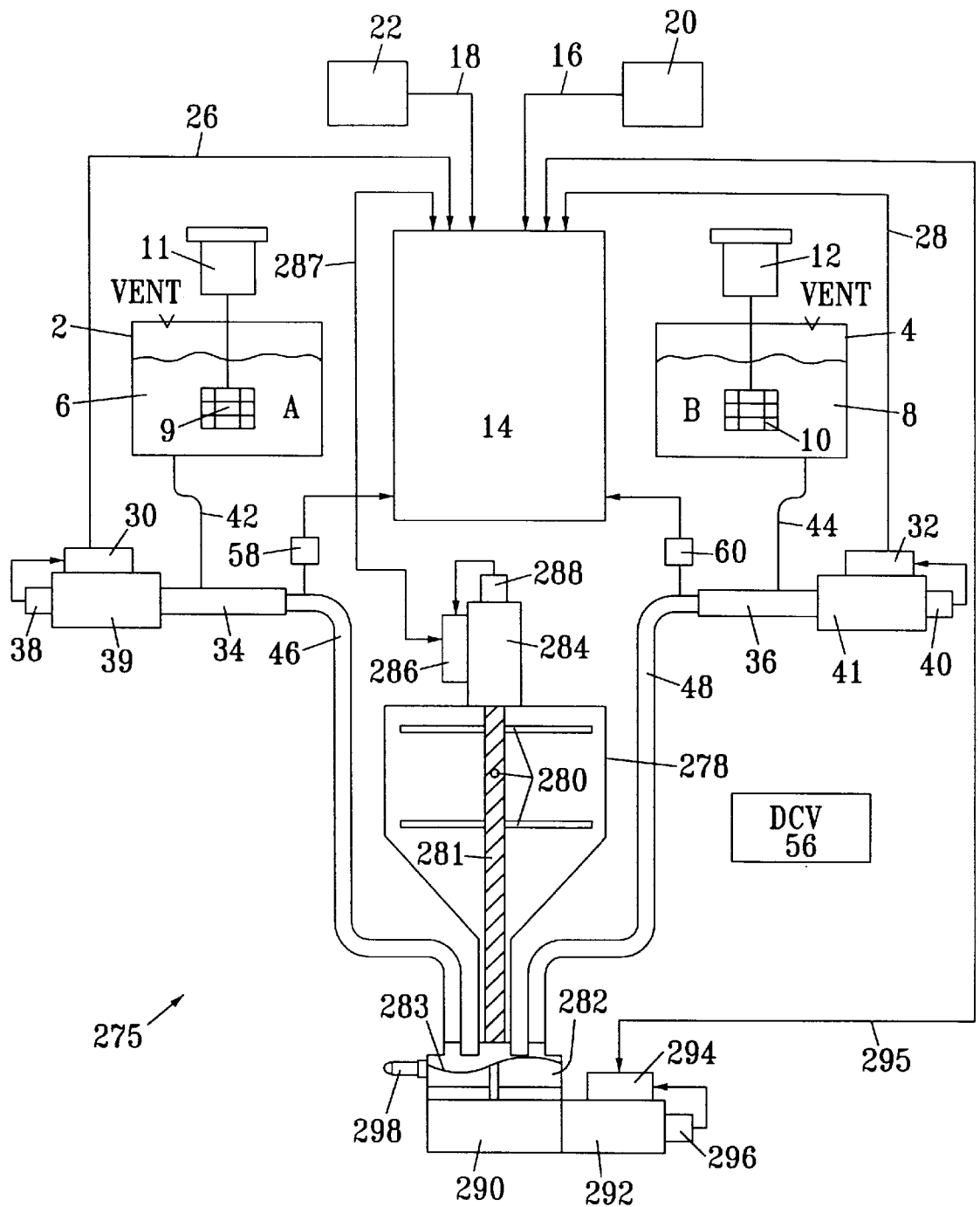
FIG. 18 is a block diagram of a preferred embodiment of a dispensing system which dispenses a powder and a single or plural component fluid.
Figure 21:
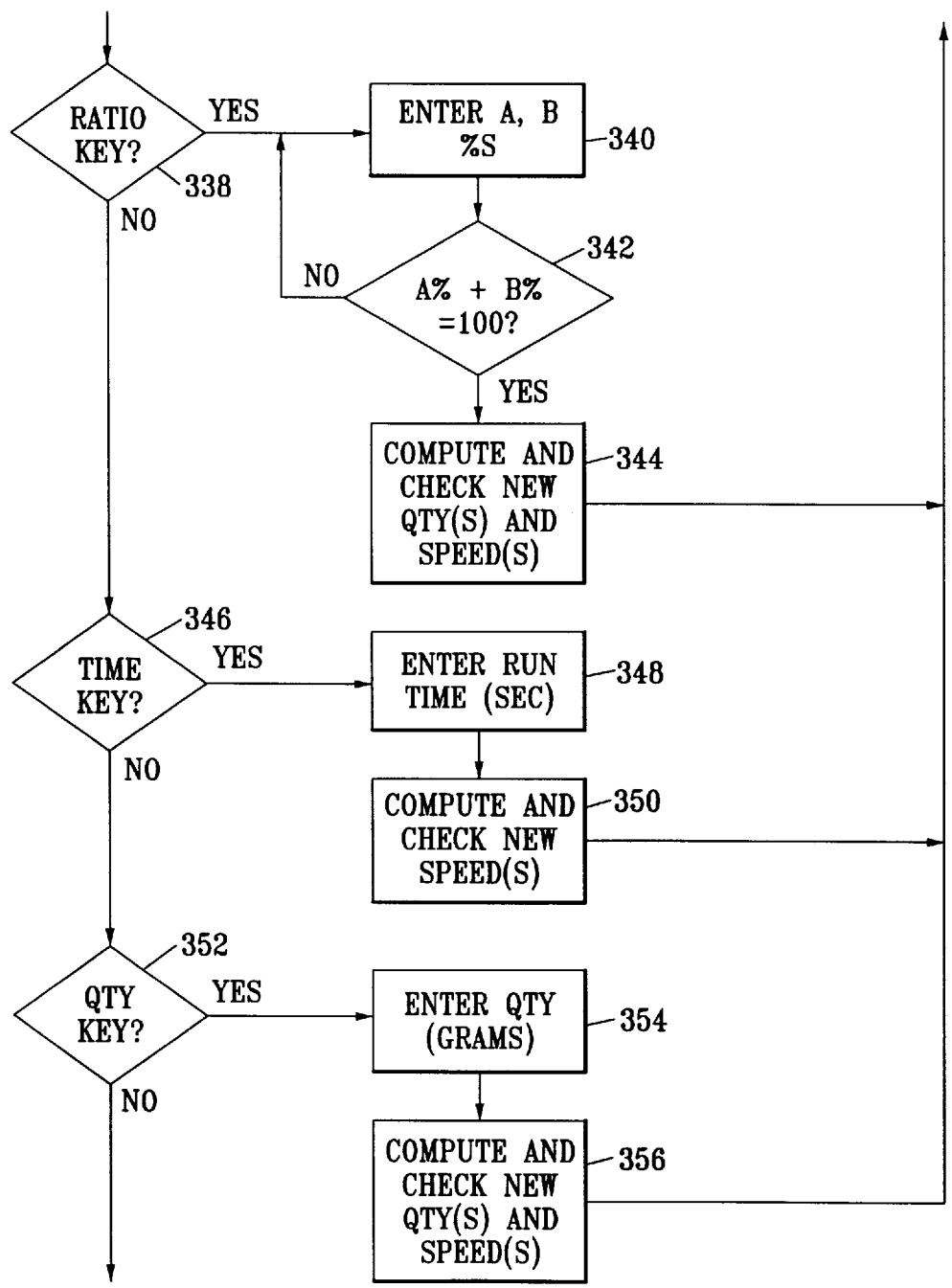
Figure 22:
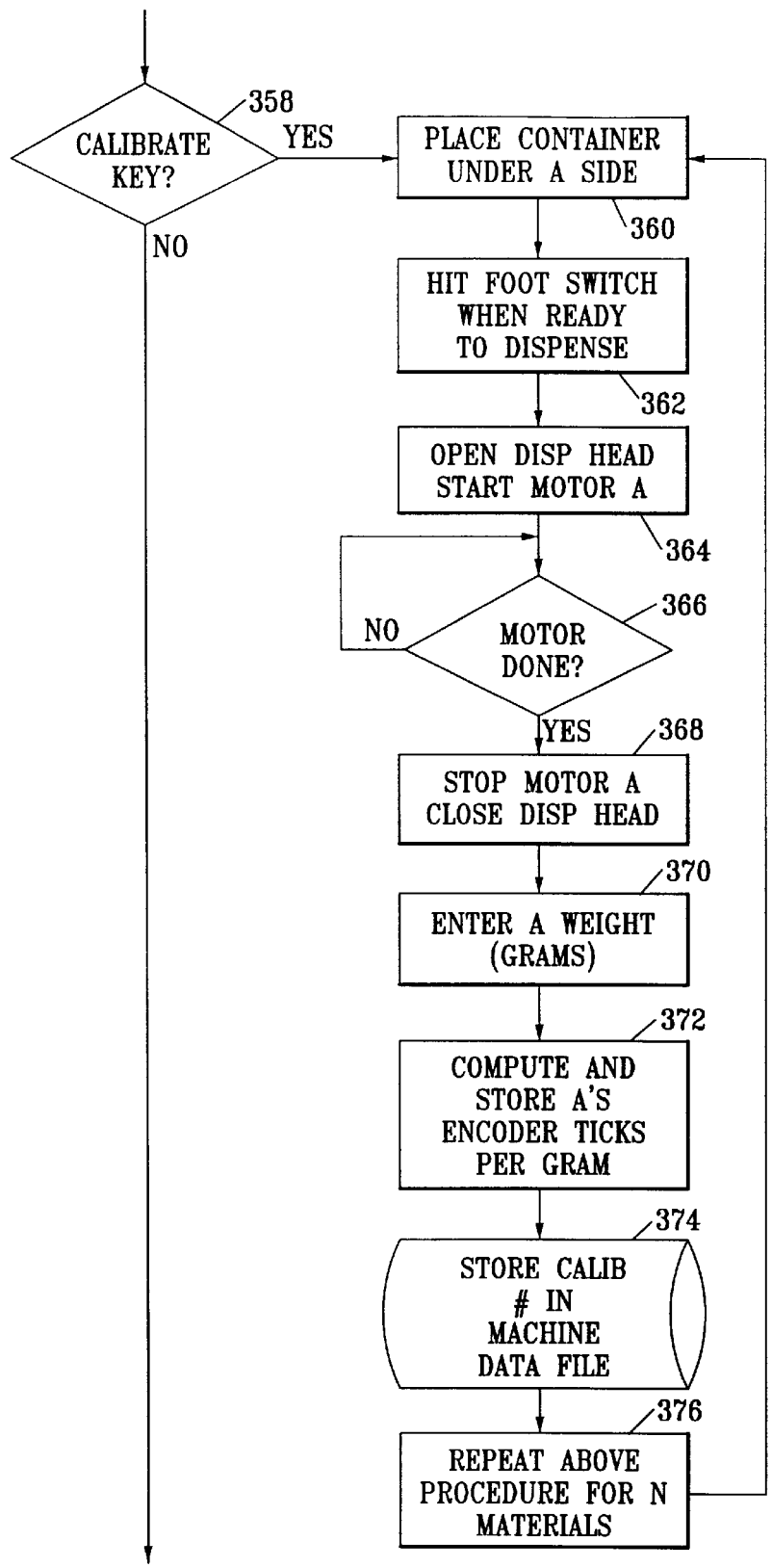
Figure 23:
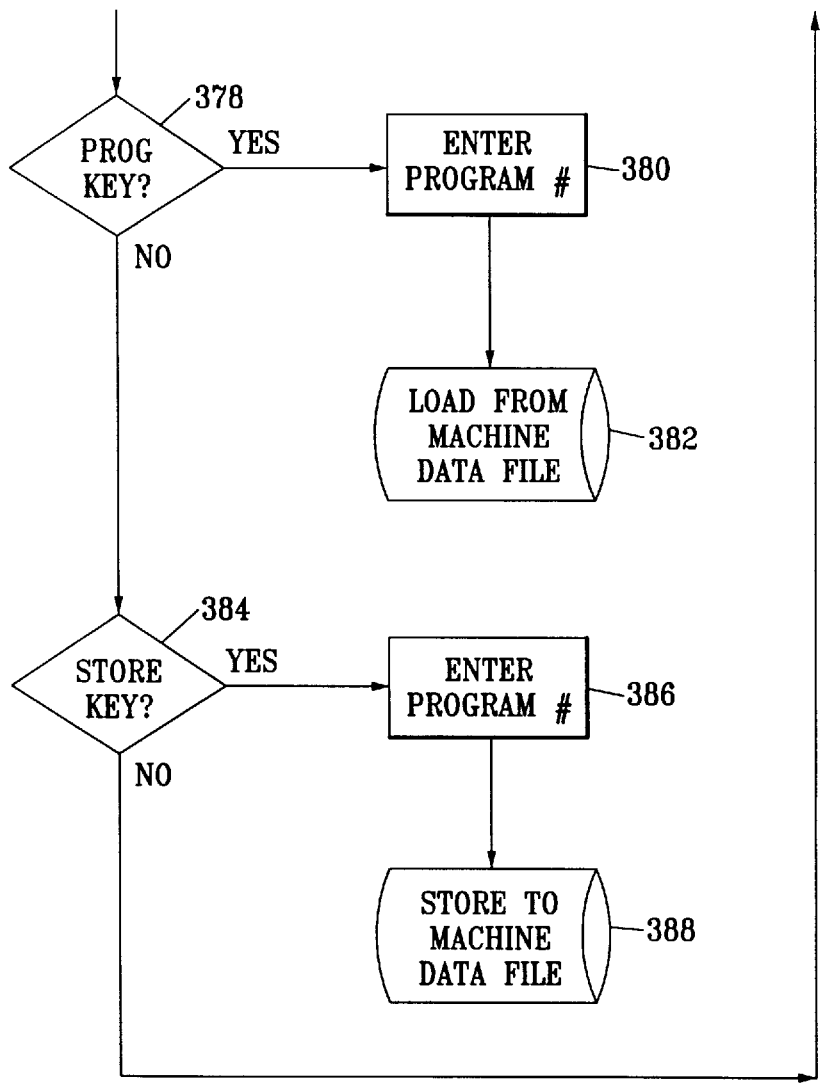

FIG. 18 is a block diagram of a preferred embodiment of a dispensing system of the present invention which meters, mixes and dispenses powders and single or plural component fluids. The dispensing system is capable of dispensing a powder and combining it with a single or plural component liquid, such as epoxy, silicone, urethanes, or adhesives. In FIG. 18, the dispensing system 275 has many of the same or similar components as the dispensing system of FIG. 1. Components that remain the same are identified by the same reference numeral.

The dispensing system 275 has a powder hopper 278 which holds the powder. The powder hopper 278 has powder agitator bars 280 attached to a motor-driven auger 281. As certain powders may not flow over themselves easily, resulting in air pockets, the agitator bars 280 mix the powder to eliminate air pockets. The auger motor 284 drives the auger 281 and is controlled by a motor controller 286. The master control unit 14 sends control signals 287 to the motor controller 286. The auger motor 284 has an encoder 288 for feeding motor information back to the motor controller 286. The master control unit 14 can use the motor information to more accurately control the auger motor 284. For example, the auger motor 284 runs at a constant desired speed. However, as the level of the powder in the powder hopper 278 falls, the current flow required to drive the auger motor 282 at the constant speed decreases. The master control unit 14 can measure the current flow to the auger motor 284 to determine the level of powder remaining in the powder hopper 278.

Alternately, the system can be made to maintain a constant current instead of constant revolutions per second. In this alternate design, as the powder level falls and as the current flow to the auger motor is kept constant, the rotational speed of the auger motor increases. The master control unit 14 can decrease the current to the auger motor when the master control unit 14 detects that the auger speed has increased. The master control unit 14 can also measure the rotational speed of the auger motor 284 to determine the level of powder remaining in the powder hopper 278.

The powder from the powder hopper 278 is dispensed into a centrifugal mixer 282. The singular or plural component liquid is also dispensed into the centrifugal mixer 282. The output of the powder hopper 278 injects the powder into the middle of the liquid. The centrifugal mixer 282 has a stirrer 283 which stirs the powder into the mixture and prevents clumping. The stirrer 283 spins the mixture outwardly where it can be dispensed out of the dispenser output 298. The centrifugal mixer 282 blends the powder and liquid together into a homogenous material which can then be dispensed in various shot sizes or at continuous flow rates. Thixotropic additives can be used to prevent settling of the solids and to help keep the solids suspended in the liquid. Other additives can be included to accelerate the cure time so that less settling of the solids will occur.

The centrifugal mixer 282 is driven by a mixer motor 292 coupled to a gear box 290. The gear box 290 permits the motor 292 to run at the motor's optimal speed while also allowing the centrifugal mixer 282 to run at the mixer's optimal speed which may differ from the motor's optimal speed. Each of the motors in the dispensing systems of FIG. 1 and FIG. 18 has a gear box which for simplicity purposes have only been shown for the centrifugal mixer motor 292. The mixer motor 292 is controlled by a motor controller 294. The master control unit 14 sends signals 295 to control the motor controller 294. An encoder 296 provides feedback information about the mixer motor 292 to the motor controller 294. The motor controller 294 can use the motor information to more accurately control the mixer motor 292.

Thus, the dispensing systems described herein have various types of feedback components. For example, the feedback components may include motor controllers, pressure transducers, flow meters, current detectors and any other components that obtain information about a device (such as a pump, motor, agitator, fluid line) and use (or let a control device use) the information to control the device. The feedback components allow the dispensing system to dispense, meter and mix more accurately.

While the pumps 34, 36 output the same volume of fluid per pump revolution, regardless of the density of the fluid, the dispensing system may require calibration prior to production runs. Prior art dispensing systems required the user to experiment by altering the velocity or time duration of the pump.

The dispensing system of the present invention employs a calibration process which separately calibrates each channel (channel A, channel B, channel C, etc.) of the system. Prior to the calibration run, the user replaces the static mixer tube 50 with a calibration nozzle (not shown). The calibration nozzle does not mix the fluids from the two channels into one output nozzle, but instead has multiple output nozzles, one for each channel. The user then weighs a first container on the scale 54 and zeroes the scale. The first container is placed under one of the output nozzles. The user presses a foot pedal to begin the dispense cycle. The master control unit 14 instructs the pump 34, 36 of each channel to output a certain volume of fluid. Actually, the pumps dispense at a rate equal to 35% of the maximum rated motor speed so as to better "weight" the accuracy of small shot sizes. The fluid from channel A is dispensed into the first container. The user weighs the first container on the scale 54 and inputs the weight in grams into the keypad. Based upon the number of revolutions made by the pump and the weight of fluid dispensed, the master control unit 14 can compare the expected weight of the fluid dispensed with the actual weight dispensed. The master control unit 14 computes a number that represents the number of encoder ticks per gram for channel A. This calibration process is independent of the pump type, gear ratio, encoder resolution, motor horsepower and the like. All of these variables are taken into account in the single computed number. The process is repeated with a second container for channel B.

Advantageously, the effects of temperature, varying pressure, transient imbalance phenomena and other variables on the actual volume of fluid dispensed are eliminated. Such a system also permits the user to dispense accurately by weight or by volume. Additionally, the systems can be calibrated for differing fluids, dispense amounts, flow rates, ratios and the like. This calibration system is quick and easy to execute.

The dispensing system is easily programmable by a user to control or change the flow rate, ratio, quantity and/or other dispensing criteria in any manner. FIG. 19 illustrates how the software flowcharts shown in FIGS. 20–23 fit together. The software flowchart of FIGS. 20–23 controls the overall aspects of the dispensing system. First, in block 300, the system initializes various hardware components such as communication ports, serial ports and other circuits. In block 302, the system loads a machine data file that contains information specific to the system such as the pump types and ratios of the gear boxes. In block 304, the system checks to see if the user enabled the pressure relief switch (i.e., an emergency stop switch). If enabled, the system will shut down the system, interrupt any dispense cycle, stop the pump motors 34, 36 and open the dispense head 49 (step 306) to relieve the overpressure condition. Otherwise, the system checks the fluid levels in the vats 2, 4 (step 308). If empty or low, an Empty flag is set (step 310). If not empty, the system reads the pressure in the pump fluid lines 46, 48 as provided by the pressure transducers 58, 60 (step 312). If the detected pressure exceeds a preset pressure limit, the system finds overpressure (step 314), stops the pump motors, and lights LEDs to warn the user (step 316). When the pressure is within normal operating conditions, the user can dispense in either a timed dispense mode or a continuous run mode. The system checks if the user entered a time duration for the dispense cycle (timed dispense mode) in step 318. If YES, the system waits for the user to depress the foot pedal (step 320) and in response, the system starts the dispense cycle and the system retrieves the desired time, calculates the stop time, opens the dispense head and starts the pump motors (step 322). If the system was in a timed run mode and the time has expired (step 324), the system will stop the pump motors and close the dispense head (step 326).

If the user selected the continuous run mode instead of the timed run, the system waits for the user to depress the foot pedal (steps 328, 332) which causes the system to open the dispense head and start the pump motors (steps 330, 334). At step 336, the system checks to see if any user inputs were made on the LCD display panel. At any time other than a dispense cycle, the user may enter the set parameters routine via the data entry keyboard 20 or 22.

The user's depression of the Ratio key (step 338) allows the user to enter the desired ratios for each constituent fluid (step 340). If the desired ratios do not total 100%, the system will require the user to re-input desired ratios (step 342). When correct ratios are entered, the system computes the new quantities of fluids desired and recalculates the correct pump speeds to use (step 344).

If the user depresses the Time key (step 346), the user may input the desired run time (step 348). The system then computes the correct pump speeds for this desired run time (step 350).

If the user depresses the Quantity key (step 352), the user may input the desired total quantity of the end product in grams (step 354). Based upon the desired weight of the end product, the system calculates new quantities and pump speeds (step 356).

If the user depresses the Calibrate key (step 358), the user can start the calibration process. In the calibration process, the user places a container under the output nozzle of channel A (step 360). The user starts the dispense cycle by depressing the foot pedal (step 362), which causes the dispense head to open and the pump motors to start (step 364). At step 366, the system checks to see if the dispense cycle is completed. If YES, the pump motors are stopped and the dispense head closed (step 368). The user takes the container with the dispensed fluid from channel A, weighs it on the scale 54, and enters the weight in grams on the keypad (step 370). The system takes the weight information and computes the number of encoder ticks per gram (step 372). Alternately, the system could calculate the density of the fluid as grams/cc. The calibrated number of ticks per gram for channel A is saved in the machine data file (step 374). This calibration procedure is repeated for each fluid (step 376).

If the user depresses the Program key (step 378), the user may select a program (step 380) previously stored in the machine data file. This selected program which may contain the user's most commonly used ratios or quantities is loaded into the system (step 382).

If the user wants to save a program into the machine data file, the user depresses the Store key (step 384) and saves the program under an identifying program number (step 386). This new program is stored by the system in the machine data file (step 388).

Figure 24:
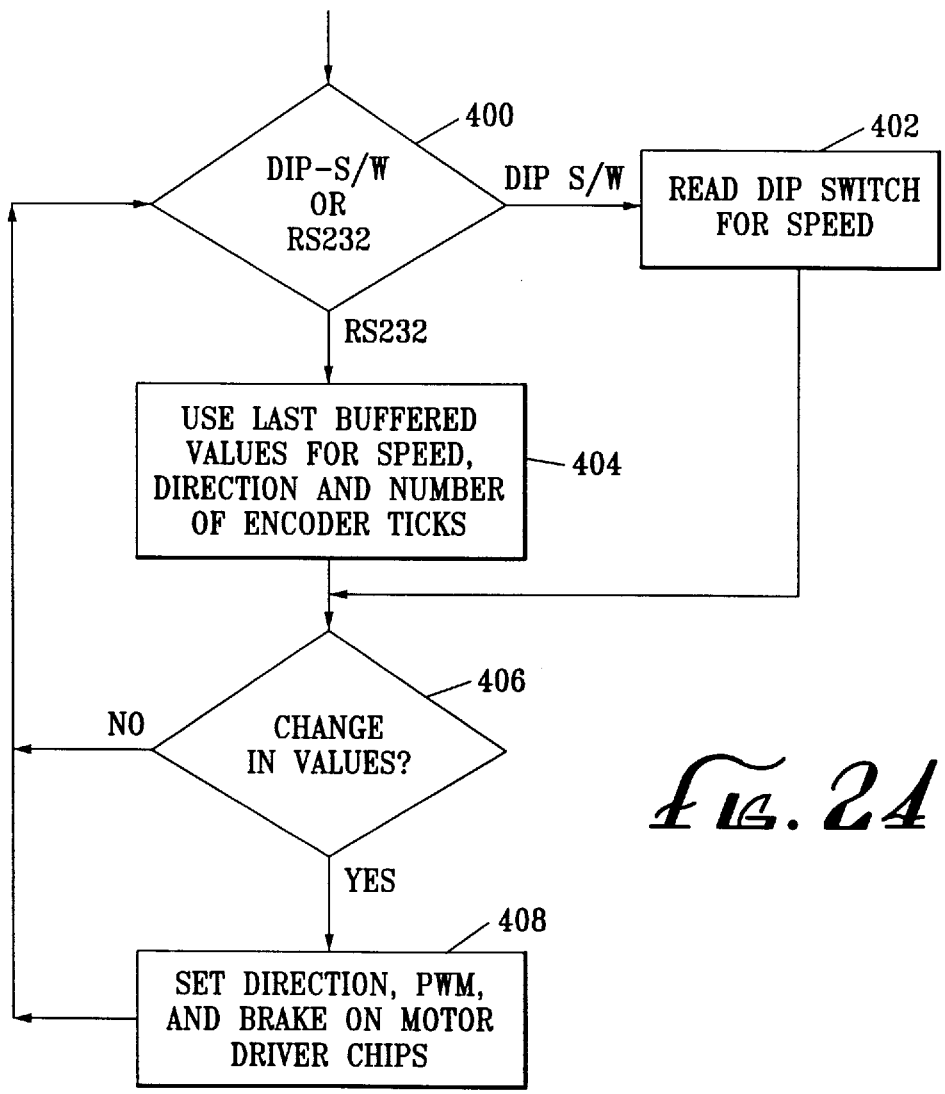
FIG. 24 is a software flowchart that describes the RS232 and DIP switch software for the motor controller.

Turning to FIG. 24, the software flowchart for controlling the motor controller 180 over the RS232 port 230 and DIP switch 232 is shown. As previously indicated, the motor controller can control the speed, direction and on/off of the motor. Starting at step 400, the system checks to see if information was received over the RS232 port or the DIP switch. If the information came from the DIP switch, the DIP switch settings are read (step 402). If information was received over the RS232 port, the system retrieves the last buffered values for the speed, direction and desired number of encoder ticks for the motor controller. At step 406, the system compares the new values with the old values. If the new values are different, the new values are saved and used by the power drivers 200 to control the motor (step 408).

Figure 25:
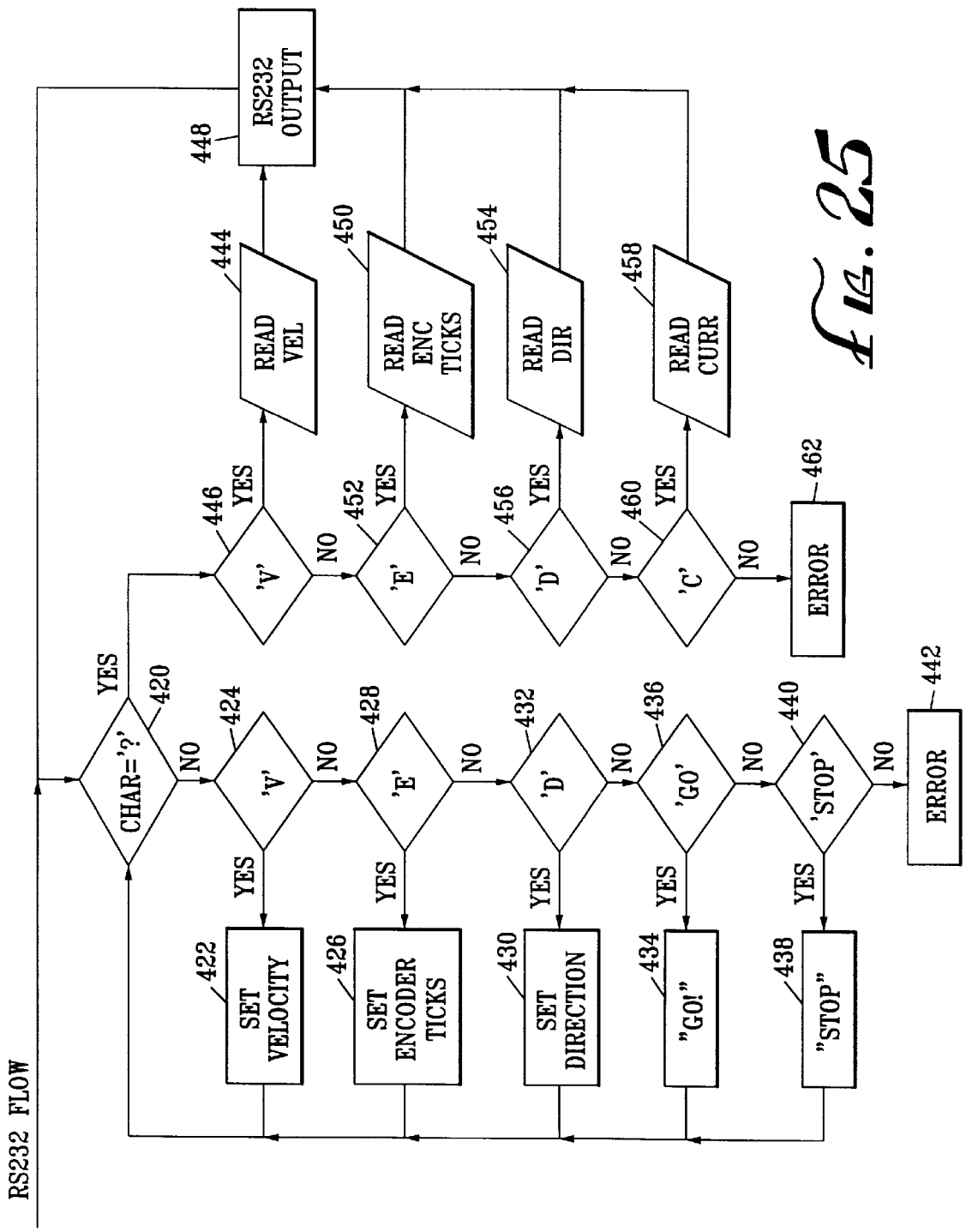
FIG. 25 is a software flowchart that describes the RS232 data flow in the motor controller.

The software flowchart of FIG. 25 illustrates how the master control unit 14 of the system controls and queries the motor controller 180. The master control unit 14 uses the RS232 port 230 either to set new values into the motor controller or to query the motor controller for these values. If the master control unit 14 wants to set new values into the motor controller, the master control unit sends a command to the motor controller that is not prefaced by the "?" character (step 420). The master control unit 14 can set the desired velocity of the motor (step 422) with a "V" command (step 424), the encoder ticks (step 426) with an "E" command (step 428), or the direction of the motor (step 430) with a "D" command (step 432). The master control unit 14 can instruct the motor controller to start the motor (step 434) with a "GO" command (step 436) or to stop the motor (step 438) with a "STOP" command (step 440).

If the master control unit 14 wants to query the motor controller for the velocity of the motor (step 444), the master control unit 14 sends a "V" command prefaced by a "?" (step 446) which causes the motor controller to output the velocity information onto the RS232 line (step 448). Similarly, the master control unit 14 can obtain the encoder ticks read (step 450) with an "E" command (step 452), the direction of the motor (step 454) with a "D" command (step 456), or the current flow to the motor (step 458) with a "C" command (step 460). Erroneous commands are indicated by steps 442 and 446.

Figure 26:
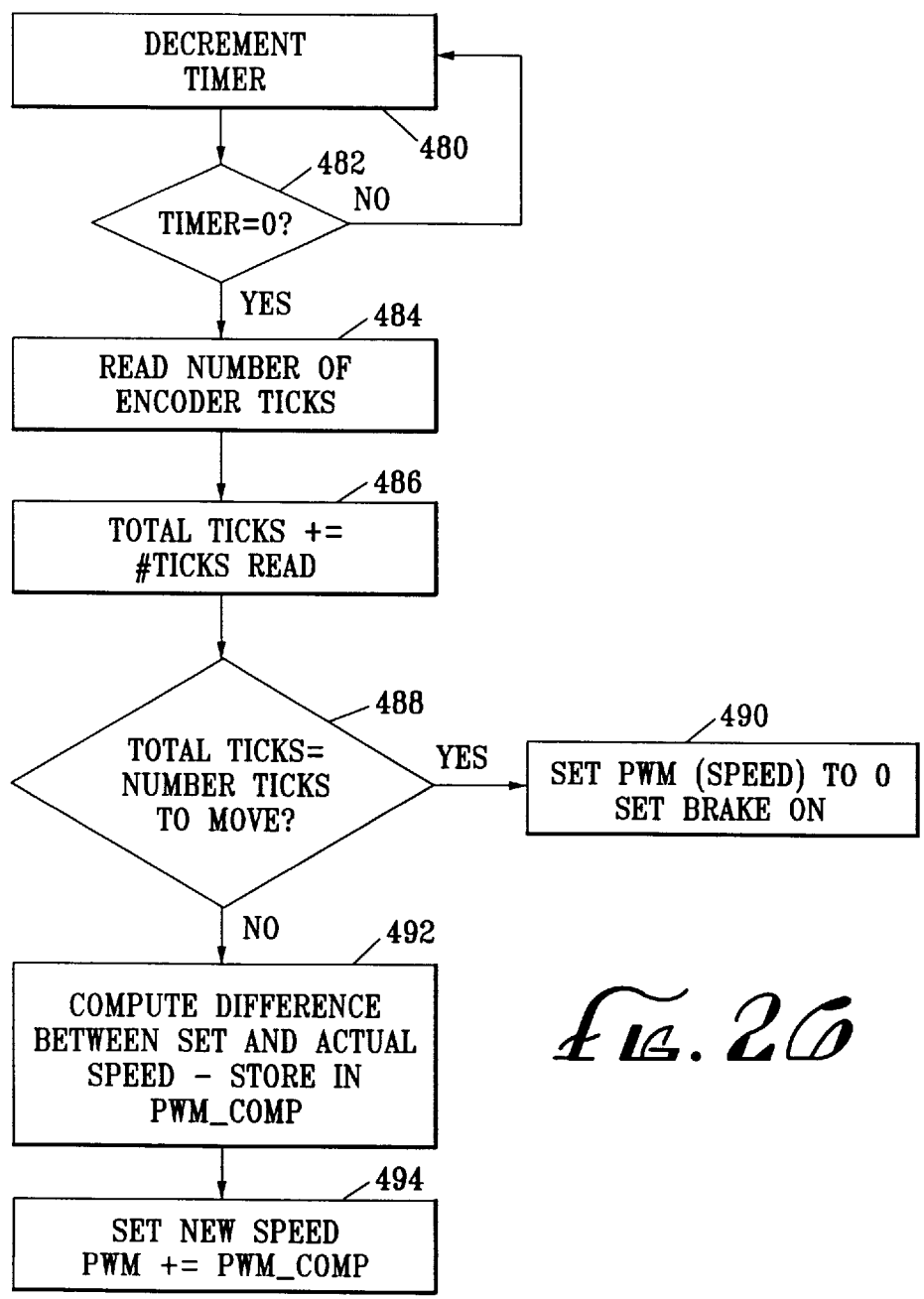
FIG. 26 is a software flowchart that describes the motor controller timer interrupt software.

The motor controller 180 uses a timer interrupt scheme to ensure that the motor is accurately controlled. FIG. 26 shows the software flowchart for this timer interrupt. A timer is set to the timeout period (step 480) which may be approximately 6 milliseconds. When this timer expires (step 482), the motor controller reads the number of encoder ticks read during the 6 millisecond period (step 484) and updates the total number of ticks read thus far with this number (step 486). The motor controller then compares the total number of ticks read against the desired number of ticks to be read (step 488). If the numbers match, the motor controller directs that the motor should be braked and stopped (step 490). If the numbers do not match yet, the motor controller compares the number of ticks read during the 6 milliseconds with the desired number of ticks to be read during the 6 milliseconds and determines whether the actual motor speed is too slow or too fast (step 492). If the actual speed is too slow or too fast, the motor controller adjusts the speed (step 494).

While the invention is susceptible to various modifications and alternative forms, specific examples thereof have been shown by way of example in the drawings and are herein described in detail. It should be understood, however, that is not intended to limit the invention to the particular forms disclosed, but on the contrary, the invention is to cover all modifications, equivalents, and alternatives falling within the spirit and scope of the invention as defined by the following claims.

We claim:

1. A dispensing system comprising
   a progressive cavity pump including a rotor formed as a helix and a stator with a bore therethrough, the rotor extending through the bore of the stator with a progressive cavity between the rotor and the stator with rotation of the rotor;
   a dispense head;
   a fluid line between the pump and the dispense head;
   a first feedback component coupled to the pump; and
   an output nozzle coupled to the dispense head for dispensing fluid.

2. The dispensing system of claim 1 further comprising an encoder coupled to the pump and to the first feedback component, the encoder obtaining position information about the pump.

3. A dispensing system comprising
   a progressive cavity pump;
   a dispense head;
   a fluid line between the pump and the dispense head;
   a first feedback component coupled to the pump; and
   an output nozzle coupled to the dispense head for dispensing fluid;
   a second feedback component coupled to the fluid line, the second feedback component obtaining information about the fluid line.

4. The dispensing system of claim 3, the second feedback component including a pressure transducer.

5. The dispensing system of claim 3, the second feedback component including a flow meter.

6. A dispensing system comprising
   a progressive cavity pump;
   a dispense head;
   a fluid line between the pump and the dispense head;
   a first feedback component coupled to the pump; and
   an output nozzle coupled to the dispense head for dispensing fluid;
   a vat;
   an agitator in the vat;
   a motor coupled to the agitator, the motor driving the agitator; and
   a third feedback component coupled to the motor, the third feedback component obtaining information about the motor.

7. The dispensing system of claim 6, the third feedback component including an encoder coupled to the motor and to the third feedback component, the encoder obtaining position information about the motor.

8. The dispensing system of claim 6, the third feedback component including a current detector coupled to the motor and to the third feedback component, the current detector obtaining current flow information about the motor and sending the current flow information to the third feedback component.

9. The dispensing system of claim 6 further comprising a control circuit coupled to the third feedback component, the control circuit receiving the information about the motor from the third feedback component and using the information to determine the amount of fluid remaining in the vat.

10. The dispensing system of claim 9, the third feedback component including a switch; and a float coupled to the switch, the float toggling the switch when the fluid level falls below a certain level.

11. A dispensing system for dispensing a powder and a single or plural component fluid, the dispensing system comprising a powder hopper having a powder outlet;

a progressive cavity pump;

a mixer coupled to the powder outlet;

a fluid line between the pump and the mixer;

a first feedback component coupled to the pump and obtaining information about the pump; and an output nozzle coupled to the mixer and capable of dispensing a mixture of powder and fluid.

12. The dispensing system of claim 11 further comprising an encoder coupled to the pump and to the first feedback component, the encoder obtaining position information about the pump.

13. The dispensing system of claim 11, the mixer being a centrifugal mixer.

14. The dispensing system of claim 11 further comprising a second feedback component coupled to the fluid line, the second feedback component obtaining information about the fluid line.

15. The dispensing system of claim 14, the second feedback component including a pressure transducer.

16. The dispensing system of claim 14, the second feedback component including a flow meter.

17. The dispensing system of claim 11 further comprising a hopper agitator inside the powder hopper;

a hopper motor coupled to the hopper agitator;

a third feedback component coupled to the hopper motor, the third feedback component obtaining information about the hopper motor.

18. The dispensing system of claim 17 further comprising an encoder coupled to the hopper motor and to the third feedback component, the encoder obtaining position information about the hopper motor.

19. The dispensing system of claim 17 further comprising a current detector coupled to the hopper motor and to the third feedback component, the current detector obtaining current flow information about the hopper motor and transmitting the current flow information to the third feedback component.

20. The dispensing system of claim 17 further comprising a control unit coupled to the third feedback component, the control unit receiving the information about the hopper motor from the third feedback component and using the information to determine the amount of powder remaining in the powder hopper.

21. The dispensing system of claim 20, the control unit using the information from the third feedback component to control the hopper motor accurately.

22. The dispensing system of claim 11 further comprising a vat;

an agitator inside the vat;

an agitator motor coupled to the agitator; and a fourth feedback component coupled to the agitator motor, the fourth feedback component obtaining information about the agitator motor.

23. The dispensing system of claim 22 further comprising an encoder coupled to the agitator motor and to the fourth feedback component, the encoder obtaining position information about the agitator motor.

24. The dispensing system of claim 22, the fourth feedback component including a switch; and a float coupled to the switch, the float toggling the switch when the fluid level falls below a certain level.

25. The dispensing system of claim 22 further comprising a control unit receiving the information about the agitator motor from the fourth feedback component and using the information to determine the amount of fluid remaining in the vat.

26. The dispensing system of claim 25, the control unit using the information about the agitator motor from the fourth feedback component to control the agitator motor accurately.

27. A dispensing system comprising a progressive cavity pump including a rotor formed as a helix and a stator with a bore therethrough, the rotor extending through the bore of the stator with a progressive cavity between the rotor and the stator with rotation of the rotor;

a pump control system including a first feedback component coupled with the pump, the first feedback component being a pump movement sensor;

an output nozzle in fluid communication with the pump.

28. The dispensing system of claim 27, the pump control system controlling pump run duration and rate.

29. The dispensing system of claim 27, the pump control system further including a motor controller calculating pump rate based on input from the pump movement sensor.

30. The dispensing system of claim 27, the pump movement sensor including an encoder positioned to measure pump movement and being in signal communication with the pump control system.

31. The dispensing system of claim 30, the pump control system further including a master control unit calculating pump rate based on encoder input.

32. The dispensing system of claim 27, the pump control system further including a master control unit calculating pump rate based on input from the pump movement sensor.

33. The dispensing system of claim 32, the pump control system including a motor controller, the pump movement sensor being in signal communication with the motor controller.

34. The dispensing system of claim 27 further comprising a dispense head in fluid communication between the pump and the output nozzle;

a valve in the dispense head controlling fluid communication between the pump and the output nozzle.

35. The dispensing system of claim 34, the pump control system being configured to close the valve when the pump stops.

36. A dispensing system comprising
a progressive cavity pump;
a pump control system including a first feedback component coupled with the pump, the first feedback component being a pump movement sensor;
an output nozzle in fluid communication with the pump;
a second feedback component in fluid communication between the pump and the output nozzle and in continuous fluid communication with the pump, the second feedback component being a pressure sensor.

37. The dispensing system of claim 36 further comprising a third feedback component in fluid communication between the pump and the output nozzle, the third feedback component being a flow meter.

38. The dispensing system of claim 36, the pump control system being configured to stop the pump when the pressure sensor senses a predetermined pressure.

39. A dispensing system comprising
a progressive cavity pump;
a pump control system including a first feedback component coupled with the pump, the first feedback component being a pump movement sensor;
an output nozzle in fluid communication with the pump
a second feedback component in fluid communication between the pump and the output nozzle, the second feedback component being a flow meter.

40. The dispensing system of claim 39, the control system being configured to compare the output of the first feedback component with the output of the second feedback element and generating a signal when the outputs do not agree.

41. A dispensing system comprising
a progressive cavity pump;
a pump control system including a first feedback component coupled with the pump, the first feedback component being a pump movement sensor;
an output nozzle in fluid communication with the pump
a second feedback component including a scale located beneath the output nozzle and in signal communication with the pump control unit, the pump control unit being configured to compare selectively the output of the first and second feedback components for calibration.

42. A dispensing system comprising
a progressive cavity pump having a motor;
a pump control system including a master control unit, a motor controller in signal communication with the master control unit and the motor, an encoder coupled with the motor to sense movement of the motor and in signal communication with the pump control system, the master control unit calculating rate based on motion input from the encoder;
an output nozzle in fluid communication with the pump;
a dispense head in the fluid communication between the pump and the output nozzle;
a valve in the dispense head controlling the fluid communication between the pump and the output nozzle;
a valve controller coupled with the valve, the valve controller being in signal communication with and controlled by the master control unit.

43. A dispensing system comprising
a plurality of progressive cavity pumps, each progressive cavity pump including a rotor formed as a helix and a stator with a bore therethrough, the rotor extending through the bore of the stator with a progressive cavity between the rotor and the stator with rotation of the rotor;
a pump control system including a plurality of first feedback components coupled with the pumps, respectively, the first feedback components being pump movement sensors;
an output nozzle in fluid communication with the pumps.

44. The dispensing system of claim 43, the pump control system controlling run duration and rate of each pump.

45. The dispensing system of claim 43, the pump control system further including motor controllers calculating pump rates based on inputs from pump movement sensors, respectively.

46. The dispensing system of claim 43, the pumps being run at constant proportional speeds by the pump control system.

47. The dispensing system of claim 43, the pumps being started and stopped simultaneously by the pump control system.

48. The dispensing system of claim 43, the pump movement sensors including encoders positioned to measure pump movement of the pumps, respectively, and being in signal communication with the pump control system.

49. The dispensing system of claim 48, the pump control system further including a master control unit calculating pump rate based on encoder input.

50. The dispensing system of claim 43, the pump control system further including a master control unit calculating pump rates based on input from the pump movement sensors, respectively.

51. The dispensing system of claim 50, the pump control system including motor controllers, the pump movement sensors being in signal communication with the motor controllers, respectively.

52. The dispensing system of claim 51, the pumps including motors, respectively, coupled thereto, the pump movement sensors being coupled with the motors, respectively.

53. The dispensing system of claim 52, the pump movement sensors including encoders sensing movement of the pumps, respectively.

54. A dispensing system comprising
a plurality of progressive cavity pumps;
a pump control system including a plurality of first feedback components coupled with the pumps, respectively, the first feedback components being pump movement sensors;
an output nozzle in fluid communication with the pumps
a plurality of second feedback components in fluid communication between the pumps, respectively, and the output nozzle, the second feedback components being in continuous fluid communication with the pumps, respectively, the second feedback components being pressure sensors.

55. The dispensing system of claim 54 further comprising a plurality of third feedback components in fluid communication between the pumps, respectively, and the output nozzles, the third feedback components being flow meters.

56. The dispensing system of claim 54, the pump control system being configured to stop the pumps when any one of the pressure sensors senses a predetermined pressure.

57. A dispensing system comprising a plurality of progressive cavity pumps;

a pump control system including a plurality of first feedback components coupled with the pumps, respectively, the first feedback components being pump movement sensors;

an output nozzle in fluid communication with the pumps a plurality of second feedback components in fluid communication between the pumps, respectively, and the output nozzle, the second feedback components being flow meters.

58. The dispensing system of claim 57, the control system being configured to compare the output of the first feedback components with the output of the second feedback components, respectively, and generating a signal when the respective outputs do not agree.

59. A dispensing system comprising a plurality of progressive cavity pumps;

a pump control system including a plurality of first feedback components coupled with the pumps, respectively, the first feedback components being pump movement sensors;

an output nozzle in fluid communication with the pumps a dispense head in fluid communication between the pumps and the output nozzle, the dispense head including chambers in fluid communication with the pumps, respectively;

a plurality of valves, the valves being in the chambers, respectively, controlling fluid communication between the pumps and the output nozzle.

60. The dispensing system of claim 59 further comprising a valve actuator coupled with the valves, the pump control system being configured to actuate the valve actuator to close the valves when the pumps stop.

61. A dispensing system comprising a plurality of progressive cavity pumps;

a pump control system including a plurality of first feedback components coupled with the pumps, respectively, the first feedback components being pump movement sensors;

an output nozzle in fluid communication with the pumps a second feedback component including a scale located beneath the output nozzle and in signal communication with the pump control unit, the pump control unit being configured to compare selectively the output of the first and second feedback components for calibration.

62. A dispensing system comprising a progressive cavity pump having a motor;

a pump control system including a master control unit, a motor controller in signal communication with the master control unit and the motor, an encoder coupled with the motor to sense movement of the motor and in signal communication with the pump control system, the master control unit calculating rate based on motion input from the encoder;

an output nozzle in fluid communication with the pump;

a dispense head in the fluid communication between the pump and the output nozzle;

a valve in the dispense head controlling the fluid communication between the pump and the output nozzle;

a valve controller coupled with the valve, the valve controller being in signal communication with and controlled by the master control unit.

63. A dispensing system comprising a progressive cavity pump having a pump constant of flow per unit of pump displacement and including a rotor formed as a helix and a stator with a bore therethrough, the rotor extending through the bore of the stator with a progressive cavity between the rotor and the stator with rotation of the rotor;

a pump control system including a master control unit having the pump constant, receiving an input value of pump output rate and an input value of total output, and generating an output of pump velocity and timed ON and OFF signals, and a pump control unit receiving the output of pump velocity and the timed ON and OFF signals and providing power to the pump to produce the pump velocity between the ON and OFF signals.

64. The dispensing system of claim 63, the positive displacement pump including a rotor formed as a helix and a stator with a bore therethrough, the rotor extending through the bore of the stator with a progressive cavity between the rotor and the stator with rotation of the rotor.

65. The dispensing system of claim 63, the pump control system further including an encoder for the pump providing a pump position signal to the pump control unit.

66. The dispensing system of claim 63, the master control unit being a microprocessor.

67. The dispensing system of claim 63, the pump control unit being a microprocessor.

68. The dispensing system of claim 63 further comprising a nozzle;

a dispense head in fluid communication between the pump and the nozzle;

a valve in the dispense head controlling fluid communication between the pump and the nozzle.

69. A dispensing system comprising a positive displacement pump having a pump constant of flow per unit of pump displacement;

a pump control system including a master control unit having the pump constant, receiving an input value of pump output rate and an input value of total output, and generating an output of pump velocity and timed ON and OFF signals, and a pump control unit receiving the output of pump velocity and the timed ON and OFF signals and providing power to the pump to produce the pump velocity between the ON and OFF signals;

a nozzle;

a dispense head in fluid communication between the pump and the nozzle;

a valve in the dispense head controlling fluid communication between the pump and the nozzle;

a pressure transducer between the pump and the valve and in signal communication with the master control unit, the master control unit including a maximum pressure value for the pressure transducer to actuate the OFF signal.

70. A dispensing system comprising a plurality of progressive cavity pumps having pump constants of flow per unit of pump displacement, each progressive cavity pump including a rotor formed as a helix and a stator with a bore therethrough, the rotor extending through the bore of the stator with a progressive cavity between the rotor and the stator with rotation of the rotor;

a pump control system including a master control unit having the pump constants, receiving an input value of output rate, an input value of total output and one or more ratios of pump output rates, and generating an output of pump velocities and timed ON and OFF signals, and pump control units receiving the output of pump velocities and the times ON and OFF signals, respectively, and providing power to the pumps, respectively, to produce the pump velocities between the ON and OFF signals.

71. The dispensing system of claim 70, further comprising output passages from the pumps, respectively, the output passages merging together to mix pump outputs.

72. A calibration process for a dispensing system having a pump, a master control unit and a pump control unit controlling pump velocity, comprising inputting to the master control unit a flow rate and total quantity to be dispensed from the system;

calculating a run time and velocity for the pump by the master control unit to correspond with the input flow rate and total quantity dispensed;

providing an ON signal from the master control unit to the pump control unit;

providing a velocity signal from the master control unit to the pump control unit;

controlling the pump to run at the velocity of the velocity signal;

providing an OFF signal from the master control unit to the pump control unit;

stopping the pump;

measuring the amount dispensed;

inputting the amount dispensed to the master control unit;

adjusting the calculation of run time and velocity in the master control unit.

73. The calibration process of claim 72, the steps of calculating, providing an ON signal, providing a velocity signal, controlling the pump, providing an OFF signal, stopping the pump, measuring, inputting the amount and adjusting the calculation being repeated.

74. the calibration process of claim 72 further comprising inputting to the master control unit a different flow rate;

repeating the process to develop an adjustment to the calculation of run time and velocity basing on flow rate.

* * * * *